(12) United States Patent
Sawabe et al.

(10) Patent No.: US 7,394,739 B2
(45) Date of Patent: Jul. 1, 2008

(54) METHOD AND APPARATUS FOR RECORDING/REPRODUCING TYPE INFORMATION ONTO/FROM A PLURALITY OF LOCATIONS ON A RECORDING MEDIUM, AND RECORDING MEDIUM HAVING TYPE INFORMATION RECORDED THEREON AT A PLURALITY OF LOCATIONS

(75) Inventors: Takao Sawabe, Tokorozawa (JP); Yukiyoshi Haraguchi, Tokorozawa (JP); Takeo Tobe, Tokorozawa (JP); Kazutaka Mitsuki, Tokorozawa (JP); Hiroyuki Kirikawa, Tokorozawa (JP); Masanori Nakahara, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 530 days.

(21) Appl. No.: 10/398,183

(22) PCT Filed: Oct. 9, 2001

(86) PCT No.: PCT/JP01/08839

§ 371 (c)(1),
(2), (4) Date: Oct. 31, 2003

(87) PCT Pub. No.: WO02/31819

PCT Pub. Date: Apr. 18, 2002

(65) Prior Publication Data

US 2004/0076097 A1 Apr. 22, 2004

(30) Foreign Application Priority Data

Oct. 6, 2000 (JP) .............................. 2000-308490
Sep. 21, 2001 (JP) .............................. 2001-290123

(51) Int. Cl.
*G11B 7/00* (2006.01)

(52) U.S. Cl. ............... 369/53.22; 369/53.21; 369/59.25
(58) Field of Classification Search ...................... None
See application file for complete search history.

(56) References Cited

U.S. PATENT DOCUMENTS

| 6,215,746 | B1 | 4/2001 | Ando et al. |
| 6,310,848 | B1 | 10/2001 | Ueki |
| 6,339,572 | B1 | 1/2002 | Hamada et al. |
| 6,707,774 | B1 * | 3/2004 | Kuroda et al. ............. 369/53.21 |
| 6,795,383 | B1 | 9/2004 | Yamamoto et al. |
| 6,937,553 | B1 * | 8/2005 | Mitui et al. ................... 369/84 |
| 2001/0011237 | A1 * | 8/2001 | Tanaka et al. ................. 705/27 |

FOREIGN PATENT DOCUMENTS

EP 0 951 019 A2 10/1999

(Continued)

*Primary Examiner*—Wayne Young
*Assistant Examiner*—Lixi Chow
(74) *Attorney, Agent, or Firm*—Steve A. Wong; Caroline T. Do

(57) ABSTRACT

A system controller is provided so as to record the second disk type information having the same content as that of the first disk type information, which is recorded in a DVD-R in advance, in a DVD-R in which the first disk type information is recorded as well as to record the record information in the DVD-R and reproduce the record information only if the first disk type information and the second disk type information have the same contents each other upon reproducing the record information.

38 Claims, 14 Drawing Sheets

FOREIGN PATENT DOCUMENTS

| | | |
|---|---|---|
| EP | 0 969 463 A1 | 1/2000 |
| EP | 1 067 544 A1 | 1/2001 |
| EP | 1 111 596 A2 | 6/2001 |
| EP | 1 134 964 A2 | 9/2001 |
| EP | 1 187 111 A2 | 3/2002 |
| WO | 00/26912 | 5/2000 |
| WO | WO00/52691 * | 9/2000 |

* cited by examiner

METHOD AND APPARATUS FOR RECORDING/REPRODUCING TYPE INFORMATION ONTO/FROM A PLURALITY OF LOCATIONS ON A RECORDING MEDIUM, AND RECORDING MEDIUM HAVING TYPE INFORMATION RECORDED THEREON AT A PLURALITY OF LOCATIONS

BACKGROUND OF THE INVENTION

1. Field of the Invention

The present invention relates to a technical field of an information recording apparatus, an information reproducing apparatus, an information recording method, an information reproducing method, recording medium, an information recording medium in which a recording controlling program is recorded and an information recording medium in which a reproducing controlling program is recorded. More specifically, the present invention relates to a technical field of an information recording apparatus and method for recording record information to be protected by copyright, an information recording medium in which a recording controlling program is recorded, a recording medium in which the record information is recorded, an information reproducing apparatus and method for reproducing the record information being recorded while securing a copyright on the record information and an information recording medium in which a reproducing controlling program is recorded.

2. Description of the Related Art

In recent years, increasing the recording density of a recording medium such as an optical disk is studied and developed actively. As a result, a DVD (read only DVD (DVD-ROM)), in which one movie for a movie theater can be recorded, has been prevailing.

On the other hand, following studies and developments of the DVD-ROM, the studies and developments with respect to DVD-R (DVD-Recordable), DVD-RW (DVD-Re-Recordable), or DVD-RAM (DVD-Rewritable), which are recordable optical disks having high recording density, are made. As a result, progress has been made in standardizing of these recordable DVDs and bringing an information recording apparatus corresponding to the DVDs to market.

Incidentally, recording information such as a movie recorded in the DVD-ROM is generally protected by copyright. Specifically, copying the record information recorded from the DVD-ROM without permission is prohibited as a general with a few exceptions.

In order to secure the copyright on the record information, conventionally, a variety of functions to prevent illegal copy or disable reproduction of record information which is illegally copied (hereinafter simply referred to illegal copy protection function) has been developed.

However, in recent years, personal computers and the Internet has been becoming pervasive, so that there may be cases where illegal software for illegally canceling the conventional illegal copy protection function is developed and provided for general use through the Internet. If this illegal software is used, there may be cases where the record information recorded in the DVD-ROM is illegally copied to any one of these recordable DVDs by a personal computer. Further, there may be cases where the recordable DVD to which the record information illegally copied is replicated in large quantity by using an authorized information recording apparatus. Therefore, there was a problem such that the protection by the copyright came to naught.

Although the above-mentioned illegal copy has to be prevented, it should not be prevented that a user records his private record information, which is recorded by his own camcorder, in the recordable DVD by using the information recording apparatus for the purpose of editing it. Because the private recording itself is not illegal.

SUMMARY OF THE INVENTION

The present invention has been made taking the problems into consideration, an object of the invention is to provide an information recording apparatus and an information recording method, an information recording medium in which recording control program is recorded, a recording medium in which the record information is recorded, an information reproducing apparatus and method for reproducing the record information, and an information recording medium in which reproducing control program is recorded, each of which is capable of securing the copyright on the record information by making a sharp distinction between a recoding medium in which the above-mentioned private record information is recorded and another recording medium in which the record information is illegally copied by a personal computer, etc., and preventing the reproduction of the record information recorded in said another recording medium in which the record information is illegally copied.

The above object of the present invention can be achieved by an information recording apparatus of the present invention for recording record information in a recording medium in which first type information indicating a type of the recording medium is recorded in advance. The apparatus is provided with: a type information recording device for recording second type information, whose correspondence to the first type information is set in advance, in the recording medium in which the first type information is recorded; and a recording device for recording the record information in the recording medium.

According to the present invention, the second type information having the correspondence to the first type information, which is set in advance is recorded in a recording medium as well as the record information is recorded in the recording medium. Then, the record information is reproduced only when the first type information has the correspondence to the first type information, so that it is possible to prohibit the illegal recording processing such that the second type information, which is different from the first type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal, recording processing, a sharp distinction between a recoding medium in which a private record information is recorded and another recording medium in which the record information is illegally copied is made as well as the reproduction of the record information recorded in said another recording medium in which the record information is illegally copied is prevented. Therefore, it is possible to secure the copyright on the record information.

In one aspect of the present invention, the type information recording device records the second type information, which indicates the same content as that the first type information indicates, in the recording medium.

According to this aspect, upon reproducing the record information, it is possible to determine the correspondence between the first type information and the second type information and prohibit the reproduction of the record information recorded under the illegal recording processing, by a simple processing.

In another aspect of the present invention, the type information recording device records the second type information, which indicates a recordable recording medium, in the recording medium.

According to this aspect, upon reproducing the record information, it is possible to determine the correspondence between the first type information and the second type information and prohibit the reproduction of the record information recorded under the illegal recording processing, by a simple processing.

In further aspect of the present invention, the record information is provided with a plurality of record information units, and the type information recording device records the second type information in both whole management information for managing the whole of the record information and management information for managing the record information units.

According to this aspect, since the second type information is recorded in both the whole management information and management information unit, if a second type information is interpolated in any one of the whole management information and management information, it is possible to prohibit the reproduction of the record information recorded under the illegal recording processing, by using another second type information.

In further aspect of the present invention, the first type information is to be recorded in lead-in area of the recording medium, and the second type information is to be recorded in data area which the record information is to be recorded.

According to this aspect, it is possible to prohibit the reproduction of the record information recorded under the illegal recording processing, by using another second type information.

In further aspect of the present invention, the first type information indicates that the recording medium is any one of DVD-ROM, DVD-R, DVD-RAM of DVD-RW.

According to this aspect, it is possible to prohibit the reproduction of the record information recorded under the illegal recording processing, by using another second type information.

In further aspect of the present invention, the DVD-R includes General type DVD-R and Authoring type DVD-R, and the type information recording device records the second type information, which indicates a recordable recording medium, in the recording medium, when the recording medium is any one of the General type DVD-R, the DVD-RAM and the DVD-RW.

According to this aspect, it is possible to prohibit the reproduction of the record information recorded under the illegal recording processing, by using another second type information.

In further aspect of the present invention, the DVD-R includes General type DVD-R and Authoring type DVD-R, and the type information recording device records the second type information, which indicates a read only recording medium, in the recording medium, when the recording medium is the Authoring type DVD-R.

According to this aspect, it is possible to prohibit the reproduction of the record information recorded under the illegal recording processing, by using another second type information.

The above object of the present invention can be achieved by an information reproducing apparatus of the present invention for reproducing record information from a recording medium in which the record information, first type information and second type information are to be recorded, the first type information indicating a type of the recording medium, the second type information corresponding to the first type information. The apparatus is provided with: a first detecting device for detecting the first type information from the recording medium; a second detecting device for detecting the second type information from the recording medium and a reproducing device for reproducing the record information only when the second type information has the correspondence to the first type information, which is set in advance.

According to the present invention, since the record information is reproduced only when the first type information has the correspondence to the first type information, so that it is possible to prohibit the illegal recording processing such that the second type information, which is different from the first type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal recording processing, a sharp distinction between a recoding medium in which a private record information is recorded and another recording medium in which the record information is illegally copied is made as well as the reproduction of the record information recorded in said another recording medium in which the record information is illegally copied is prevented. Therefore, it is possible to secure the copyright on the record information.

In one aspect of the present invention, the reproducing device ejects the recording medium loaded in the information reproducing apparatus from the information reproducing apparatus if the second type information has the correspondence to the first type information, which is different from the correspondence set in advance.

According to this aspect, if the second type information has the correspondence to the first type information, which is different from the correspondence set in advance, the recording medium loaded in the information reproducing apparatus is ejected from the information reproducing apparatus. Therefore, it is possible to prohibit the reproduction of the record information, which is recorded by the illegal recording processing, more effectively.

In another aspect of the present invention, the correspondence set in advance is that the second type information indicates the same content as that the first type information indicates.

According to this aspect, upon reproducing the record information, it is possible to determine the correspondence between the first type information and the second type information and prohibit the reproduction of the record information recorded under the illegal recording processing, by a simple processing.

In further aspect of the present invention, the correspondence set in advance is that the second type information indicates whether the recording medium is a recordable recording medium or not.

According to this aspect, it is possible to prohibit the reproduction of the record information recorded under the illegal recording processing.

In further aspect of the present invention, the record information comprises a plurality of record information units, and the second type information is recorded in both whole management information for managing the whole of the record information and management information for managing the record information units.

According to this aspect, since the second type information is recorded in both the whole management information and management information, if a second type information is interpolated in any one of the whole management information and management information, it is possible to prohibit the reproduction of the record information recorded under the illegal recording processing, by using another second type information.

In further aspect of the present invention, the first type information is to be recorded in lead-in area of the recording medium, and the second type information is to be recorded in data area which the record information is to be recorded.

According to this aspect, it is possible to prohibit the reproduction of the record information recorded under the illegal recording processing.

In further aspect of the present invention, the first type information indicates that the recording medium is any one of DVD-ROM, DVD-R, DVD-RAM and DVD-RW.

According to this aspect, it is possible to prohibit the reproduction of the record information recorded under the illegal recording processing.

In further aspect of the present invention, the DVD-R includes General type DVD-R and Authoring type DVD-R, and the reproducing device reproduces the record information, when the first type information indicates DVD-ROM or the Authoring type DVD-R and the second type information indicates a read only recording medium.

According to this aspect, it is possible to prohibit the reproduction of the record information recorded under the illegal recording processing.

In further aspect of the present invention, the DVD-R includes General type DVD-R and Authoring type DVD-R, and the reproducing device reproduces the record information, when the first type information indicates that the recording medium is any one of the General type DVD-R, DVD-RAM and DVD-RW and the second type information indicates a recordable recording medium.

According to this aspect, it is possible to prohibit the reproduction of the record information recorded under the illegal recording processing.

The above object of the present invention can be achieved by a recording medium of the present invention, which is for use in an information recording and/or reproducing apparatus. The medium is provided with: a first type information recording area in which a first type information indicating a type of the recording medium is to be recorded in advance, a second type information recording area in which a second type information, whose correspondence to the first type information is set in advance, is to be recorded; and a record information recording area in which record information is to be recorded in a recording medium.

According to the present invention, upon recording the record information in the recording medium, the second type information having the correspondence to the first type information, which is set in advance is recorded in the second type information recording area. Then, upon reproducing the record information, the record information is reproduced only when the first type information has the correspondence to the first type information, so that it is possible to prohibit the illegal recording processing such that the second type information, which is different from the first type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal recording processing, a sharp distinction between a recoding medium in which a private record information is recorded and another recording medium in which the record information is illegally copied is made as well as the reproduction of the record information recorded in said another recording medium in which the record information is illegally copied is prevented. Therefore, it is possible to secure the copyright on the record information.

In one aspect of the present invention, the correspondence set in advance is that the second type information indicates the same content as that the first type information indicates.

According to this aspect, upon reproducing the record information, it is possible to determine the correspondence between the first type information and the second type information and prohibit the reproduction of the record information recorded under the illegal recording processing, by a simple processing.

In another aspect of the present invention, the correspondence set in advance is that the second type information indicates whether the recording medium is a recordable recording medium or not.

According to this aspect, it is possible to prohibit the reproduction of the record information recorded under the illegal recording processing.

In further aspect of the present invention, the record information is provided with a plurality of record information units, and the second type information recording area is formed in both whole management information for managing the whole of the record information and a management information for managing the record information units.

According to this aspect, since the second type information is recorded in both the whole management information and management information, if a second type information is interpolated in any one of the whole management information and management information, it is possible to prohibit the reproduction of the record information recorded under the illegal recording processing, by using another second type information.

In further aspect of the present invention, the first type information recording area of the recording medium, and the second type information is formed in the record information recording area.

According to this aspect, it is possible to prohibit the reproduction of the record information recorded under the illegal recording processing.

In further aspect of the present invention, the first disk type information indicated that the recording medium is any one of DVD-ROM, DVD-R, DVD-RAM and DVD-RW.

According to this aspect, it is possible to prohibit the reproduction of the record information recorded under the illegal recording processing.

In further aspect of the present invention, the DVD-R includes General type DVD-R and Authoring type DVD-R, and the second type information which indicates a read only recording medium is to be recorded in the second type information recording area, when the first type information indicates DVD-ROM or the Authoring type DVD-R.

According to this aspect, it is possible to prohibit the reproduction of the record information recorded under the illegal recording processing.

In further aspect of the present invention, the DVD-R includes General type DVD-R and Authoring type DVD-R, and the second type information which indicates a recordable recording medium is to be recorded in the second type information recording area, when the first type information indicates that the recording medium is any one of the General type DVD-R, DVD-RAM and DVD-RW.

The above object of the present invention can be achieved by an information recording method of the present invention which records record information in a recording medium in which a first type information indicating a type of the recording medium is to be recorded in advance. The method is provided with: a type information recording process for recording a second type information, whose correspondence to the first type information is set in advance, in the recording medium in which the first type information is to be recorded; and a recording process for recording the record information in the recording medium.

According to the present invention, the second type information having the correspondence to the first type information, which is set in advance is recorded in a recording medium as well as the record information is recorded in the recording medium. Then, the record information is reproduced only when the first type information has the correspondence to the first type information, so that it is possible to prohibit the illegal recording processing such that the second type information, which is different from the firs type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal recording processing, a sharp distinction between a recoding medium in which a private record information is recorded and another recording medium in which the record information is illegally copied is made as well as the reproduction of the record information recorded in said another recording medium in which the record information is illegally copied is prevented. Therefore, it is possible to secure the copyright on the record information.

In one aspect of the present invention, the type information recording process records the second type information, which indicates the same content as that the first type information indicates, in the recording medium in which the first type information is recorded.

According to this aspect, upon reproducing the record information, it is possible to determine the correspondence between the first type information and the second type information and prohibit the reproduction of the record information recorded under the illegal recording processing, by a simple processing.

In another aspect of the present invention, the type information recording process records the second type information, which indicates a recordable recording medium, in the recording medium.

According to this aspect, it is possible to prohibit the reproduction of the record information recorded under the illegal recording processing.

In further aspect of the present invention, the record information is provided with a plurality of record information units, and the type information recording process records the second type information in both whole management information for managing the whole of the record information and management information for managing the record information units.

According to this aspect, since the second type information is recorded in both the whole management information and management information, if a second type information is interpolated in any one of the whole management information and management information, it is possible to prohibit the reproduction of the record information recorded under the illegal recording processing, by using another second type information.

In further aspect of the present invention, the first type information is to be recorded in lead-in area of the recording medium, and the second type information is to be recorded in data area which the record information is to be recorded.

According to this aspect, it is possible to prohibit the reproduction of the record information recorded under the illegal recording processing.

In further aspect of the present invention, the first type information indicates that the recording medium is any one of DVD-ROM, DVD-R, DVD-RAM of DVD-RW.

According to this aspect, it is possible to prohibit the reproduction of the record information recorded under the illegal recording processing.

In further aspect of the present invention, the DVD-R includes General type DVD-R and Authoring type DVD-R, and the type information recording process records the second type information, which indicates a recordable recording medium, in the recording medium., when the recording medium is any one of the General type DVD-R, the DVD-RAM and the DVD-RW.

According to this aspect, it is possible to prohibit the reproduction of the record information recorded under the illegal recording processing.

In further aspect of the present invention, the DVD-R includes General type DVD-R and Authoring type DVD-R, and the type information recording process records the second type information, which indicates a read only recording medium, in the recording medium, when the recording medium is the Authoring type DVD-R.

According to this aspect, it is possible to prohibit the reproduction of the record information recorded under the illegal recording processing.

The above object of the present invention can be achieved by an information reproducing method of the present invention which reproduces record information from a recording medium in which the record information, first type information and second type information are recorded, the first type information indicating a type of the recording medium, the second type information corresponding to the first type information. The method is provided with: a first detecting process for detecting the first type information from the recording medium; a second detecting process for detecting the second type information from the recording medium; and a reproducing process for reproducing the record information only when the second type information has the correspondence to the first type information, which is set in advance.

According to the present invention, since the record information is reproduced only when the first type information has the correspondence to the first type information, so that it is possible to prohibit the illegal recording processing such that the second type information, which is different from the first type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal recording processing, a sharp distinction between a recoding medium in which a private record information is recorded and another recording medium in which the record information is illegally copied is made as well as the reproduction of the record information recorded in said another recording medium in which the record information is illegally copied is prevented. Therefore, it is possible to secure the copyright on the record information, In one aspect of the present invention, the reproducing process ejects the recording medium loaded in an information reproducing apparatus from the information reproducing apparatus if the second type information has the correspondence to the first type information, which is different from the correspondence set in advance.

According to this aspect, if the second type information has the correspondence to the first type information, which is different from the correspondence set in advance, the recording medium loaded in the information reproducing apparatus is ejected from the information reproducing apparatus. Therefore, it is possible to prohibit the reproduction of the record information, which is recorded by the illegal recording processing, more effectively.

The above object of the present invention can be achieved by an information recording medium of the present invention in which a recording control program is recorded readably by a recording computer in an information recording apparatus for recording record information in a recording medium in which a first type information indicating a type of the recording medium is to be recorded in advance. The recording control program causes the recording computer to function as; a type information recording device for recording a second type information, whose correspondence to the first type information is set in advance, in the recording medium in which the first type information is recorded, and a recording device for recording the record information in the recording medium.

According to the present invention, the second type information having the correspondence to the first type information, which is set in advance is recorded in a recording medium as well as the record information is recorded in the recording medium. Then, the record information is reproduced only when the first type information has the correspondence to the first type information, so that it is possible to prohibit the illegal recording processing such that the second type information, which is different from the first type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal recording processing, a sharp distinction between a recoding medium in which a private record information is recorded and another recording medium in which the record information is illegally copied is made as well as the reproduction of the record information recorded in said another recording medium in which the record information is illegally copied is prevented. Therefore, it is possible to secure the copyright on the record information.

In one aspect of the present invention, the record information is provided with a plurality of record information units, and the type information recording device records the second type information in both whole management information for managing the whole of the record information and management information for managing the record information units.

According to this aspect, since the second type information is recorded in both the whole management information and management information, if a second type information is interpolated in any one of the whole management information and management information, it is possible to prohibit the reproduction of the record information recorded under the illegal recording processing, by using another second type information.

In another aspect of the present invention, the first type information is to be recorded in lead-in area of the recording medium, and the second type information is to be recorded in data area which the record information is to be recorded.

According to this aspect, it is possible to prohibit the reproduction of the record information recorded under the illegal recording processing.

In further aspect of the present invention, the first type information indicates that the recording medium is any one of DVD-ROM, DVD-R, DVD-RAM of DVD-RW.

According to this aspect, it is possible to prohibit the reproduction of the record information recorded under the illegal recording processing.

In further aspect of the present invention, the DVD-R includes General type DVD-R and Authoring type DVD-R, and the type information recording device records the second type information, which indicates a recordable recording medium, in the recording medium, when the recording medium is any one of the General type DVD-R, the DVD-RAM and the DVD-RW.

According to this aspect, it is possible to prohibit the reproduction of the record information recorded under the illegal recording processing.

In further aspect of the present invention, the DVD-R includes General type DVD-R and Authoring type DVD-R, and the type information recording device records the second type information, which indicates a read only recording medium, in the recording medium, when the recording medium is the Authoring type DVD-R.

According to this aspect, it is possible to prohibit the reproduction of the record information recorded under the illegal recording processing.

The above object of the present invention can be achieved by an information recording medium of the present invention in which a reproducing control program is recorded readably by a reproducing computer in an information reproducing apparatus for reproducing record information from a recording medium in which the record information, first type information and second type information are recorded, the first type information indicating a type of the recording medium, the second type information corresponding to the first type information. The reproducing control program causes the reproducing computer to function as: a first detecting device for detecting the first type information from the recording medium; a second detecting device for detecting the second type information from the recording medium; and a reproducing device for reproducing the record information only when the second type information has the correspondence to the first type information, which is set in advance.

According to the present invention, since the record information is reproduced only when the first type information has the correspondence to the first type information, so that it is possible to prohibit the illegal recording processing such that the second type information, which is different from the first type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal recording processing, a sharp distinction between a recoding medium in which a private record information is recorded and another recording medium in which the record information is illegally copied is made as well as the reproduction of the record information recorded in said another recording medium in which the record information is illegally copied is prevented. Therefore, it is possible to secure the copyright on the record information.

In one aspect of the present invention, the reproducing device ejects the recording medium loaded in the information reproducing apparatus from the information reproducing apparatus if the second type information has the correspondence to the first type information, which is different from the correspondence set in advance.

According to this aspect, if the detected second type information has the correspondence to the detected first type information, which is different from the correspondences set in advance, the recording medium loaded in the information reproducing apparatus is ejected from the information reproducing apparatus. Therefore, it is possible to prohibit the reproduction of the record information, which is recorded by the illegal recording processing, more effectively.

The above object of the present invention can be achieved by a computer data signal embodied in a carrier wave and representing a sequence of instructions, of the present invention, which is executed by a recording computer in an information recording apparatus for recording record information in a recording medium in which a first type information indicating a type of the recording medium is recorded in advance. The instructions are provided with the steps of: recording a second type information, whose correspondence to the first type information is set in advance, in the recording medium in which the first type information is to be recorded; and recording the record information in the recording medium.

According to the present invention, the second type information having the correspondence to the first type information, which is set in advance is recorded in a recording medium as well as the record information is recorded in the recording medium. Then, the record information is reproduced only when the first type information has the correspondence to the first type information, so that it is possible to prohibit the illegal recording processing such that the second type information, which is different from the first type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal recording processing, a sharp distinction between a recoding medium in which a private record information is recorded and another recording medium in which the record information is illegally copied is made as well as the reproduction of the record information recorded in said another recording medium in which the record information is illegally copied is prevented. Therefore, it is possible to secure the copyright on the record information.

In one aspect of the present invention, the record information is provided with a plurality of record information units, and the step of recording the record information records the second type information in both whole management information for managing the whole of the record information and management information for managing the record information units.

According to this aspect, since the second type information is recorded in both the whole management information and management information, if a second type information is interpolated in any one of the whole management information and management information, it is possible to prohibit the reproduction of the record information recorded under the illegal recording processing, by using another second type information.

In another aspect of the present invention, the first type information is to be recorded in lead-in area of the recording medium, and the second type information is to be recorded in data area which the record information is to be recorded.

According to this aspect, it is possible to prohibit the reproduction of the record information recorded under the illegal recording processing.

In further aspect of the present invention, the first type information indicates that the recording medium is any one of DVD-ROM, DVD-R, DVD-RAM of DVD-RW.

According to this aspect, it is possible to prohibit the reproduction of the record information recorded under the illegal recording processing.

In further aspect of the present invention, the DVD-R includes General type DVD-R and Authoring type DVD-R, and the type information recording device records the second type information, which indicates a recordable recording medium, in the recording medium, when the recording medium is any one of the General type DVD-R, the DVD-RAM and the DVD-RW.

According to this aspect, it is possible to prohibit the reproduction of the record information recorded under the illegal recording processing.

In further aspect of the present invention, the DVD-R includes General type DVD-R and Authoring type DVD-R, and the type information recording device records the second type information, which indicates a read only recording medium, in the recording medium, when the recording medium is the Authoring type DVD-R.

According to this aspect, it is possible to prohibit the reproduction of the record information recorded under the illegal recording processing.

The above object of the present invention can be achieved by a computer data signal embodied in a carrier wave and representing a sequence of instructions, of the present invention, which is executed by a reproducing computer in an information reproducing apparatus for reproducing record information from a recording medium in which the record information, a first type information and second type information are recorded, the first type information indicating a type of the recording medium, the second type information corresponding to the first type information. The instructions are provided with the steps of: detecting the first type information from the recording medium; detecting the second type information from the recording medium; and reproducing the record information only when the second type information has the correspondence to the first type information, which is set in advance.

According to the present invention, since the record information is reproduced only when the first type information has the correspondence to the first type information, so that it is possible to prohibit the illegal recording processing such that the second type information, which is different from the first type information, is recorded or to prohibit the reproduction of the record information, which is recorded by the illegal recording processing such that the second type information is not recorded. Accordingly, by effectively prohibiting the reproduction of the record information which is recorded by the information processing apparatus or the like under an illegal recording processing, a sharps distinction between a recoding medium in which a private record information is recorded and another recording medium in which the record information is illegally copied is made as well as the reproduction of the record information recorded in said another recording medium in which the record information is illegally copied in prevented. Therefore, it is possible to secure the copyright on the record information.

In one aspect of the present invention, the step of reproducing the record information ejects the recording medium loaded in the information reproducing apparatus from the information reproducing apparatus if the second type information has the correspondence to the first type information, which is different from the correspondence set in advance.

According to this aspect, if the second type information has the correspondence to the first type information, which is different from the correspondence set in advance, the recording medium loaded in the information reproducing apparatus is ejected from the information reproducing apparatus. Therefore, it is possible to prohibit the reproduction of the record information, which is recorded by the illegal recording processing, more effectively.

BRIEF DESCRIPTION OF THE DIAGRAMS

DESCRIPTION OF THE PREFERRED EMBODIMENTS

A preferred embodiment of the present invention will be explained with reference to the drawings.

The embodiment to be explained below is applied to an information recording/reproducing apparatus, which records the record information inputted from an external source in a DVD-R which is a DVD capable of recording the record information only one time while it is incapable of rewriting the record information. The information recording/reproducing apparatus can also reproduce record information, which is recorded in a read only DVD (DVD-ROM) or a DVD-RW which is another recordable DVD, in addition to the record information recorded in the DVD-R.

(I) Embodiment of DVD-R

A DVD-R served as a recording medium, in which the recording information is recorded and reproduced by the information recording/reproducing apparatus, will be described with reference to FIG. 1.

Figure 1:
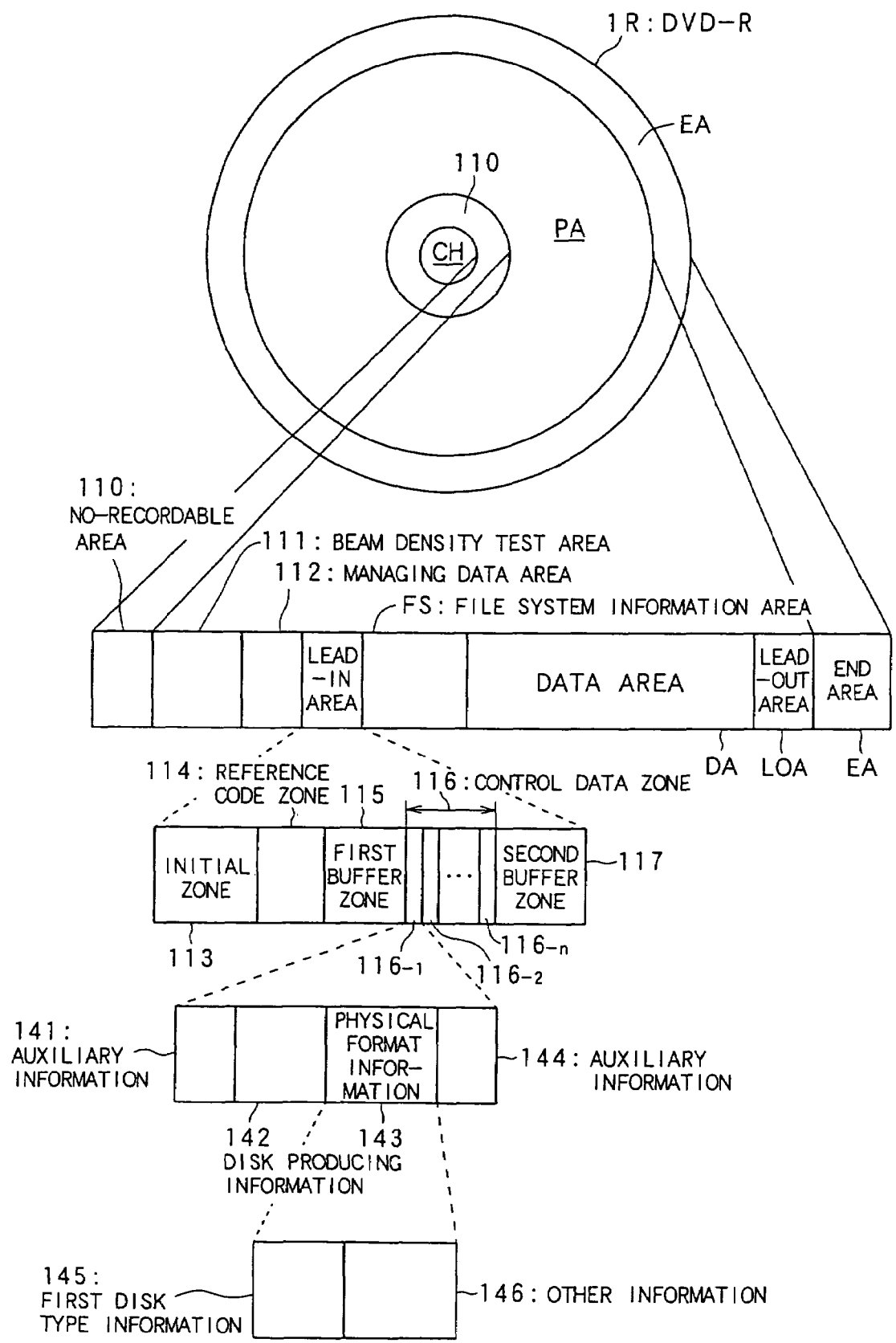
FIG. 1 is a plane outline diagram of a DVD-R according to a preferred embodiment and a diagram for illustrating a physical recording format such that the recording of the recording information is completed.

FIG. 1 illustrates a plan external view and a physical recording format of the DVD-R after recording the record information is completed, according to the present embodiment.

The DVD-R according to the present embodiment comprises an optical disc capable of recording only once with a recording membrane such as a color membrane. In a plan external view, the DVD-R has a center hall CH at a center thereof to fix the DVD-R in a spindle motor for rotating the DVD-R in the information recording/reproducing apparatus. The DVD-R further has a no-redcordable area 110 not capable of recording the record information from the inside thereof to the inner circumference, a redcordable area PA capable of recording the recording information and an end area EA not capable of recording the recording information in the outer circumference side.

Further, the redcordable area PA after recording is completed, is composed of: a beam density test area 111 in which the test information for setting the density of the optical beam to be used for recording the record information is recorded; a managing data area 112 in which the data of the set optical beam density and the managing data to be described later in the recording process are recorded; a lead-in area LIA in which the start information or the like to be read out upon starting the reproduction of the recorded record information are recorded in the recording process of the record information; a file system information area FS in which the file system information is recorded as the information for indicating a file structure in the record information; a data area DA in which the record information is actually recorded; and a lead-out area LOA in which the termination information or the like to be read out upon terminating the reproduction of the recorded record information are recorded in the recording process of the record information.

The lead-in area LIA of each area constituting the redcordable area PA is an area in which each information described later is recorded in its portion in advance upon manufacturing a DVD-R 1R. Therefore, the portion is already formed even in a DVD-R 1R which is on the market as a blank disk, in which no record information to be reproduced is recorded.

The lead-in area LIA is divided into: an initial zone 113 in which zero data indicating that the lead-in area LIA starts therefrom is recorded; a reference code zone 114 in which a management information and the like, which are referred upon reproducing the record information recorded in the DVD-R 1R, are recorded; a first buffer zone 115 functioning as a buffer zone between the reference code zone 114 and a control data zone 116 described later; a control data zone 116 in which management information and the like, which is to be referred upon starting recoding the record information and divided into n pieces of blocks $116_{-1}$ through $116_{-n}$, are recorded; and a second buffer zone 117 functioning as a buffer zone between the control data zone 116 and the file system information area.

Each of blocks $116_{-1}$ through $116_{-n}$ constituting the control data zone 116 is provided with auxiliary information 141 and 144, a disk producing information 142 in which producing information relates to producing of the DVD-R 1R (a producer's name), a physical format information 143 which is information indicating an optical disk type, etc. of DVD-R 1R.

The physical format information 143 is provided with a first disk type information 145 which indicates an optical disk type of the DVD-R 1R, other information 146 which is information other than the first disk type information. The first disk type information 145 is comprised of 4-bit information. In the DVD-R 1R, the value of the first disk type information 145 is "0010b" (b indicates a binary number).

It is standardized that the first disk type information 145 is used in other DVDS, such as a DVD-ROM, the recordable DVD-RW and DVD-RAM. Specifically, in the DVD-ROM, the value of the first disk type information 145 is set as "000b". In the DVD-RAM, the value of the first disk type information 145 is set as "0001b".

(II) Embodiment of Physical Format and Logical Format of Record Information

Next, a physical format and a logical format, with which the record information recorded in the data area DA by the information recording/reproducing apparatus of the present embodiment should be in conformity, will be schematically explained with reference to FIGS. 2 to 6.

Figure 2:
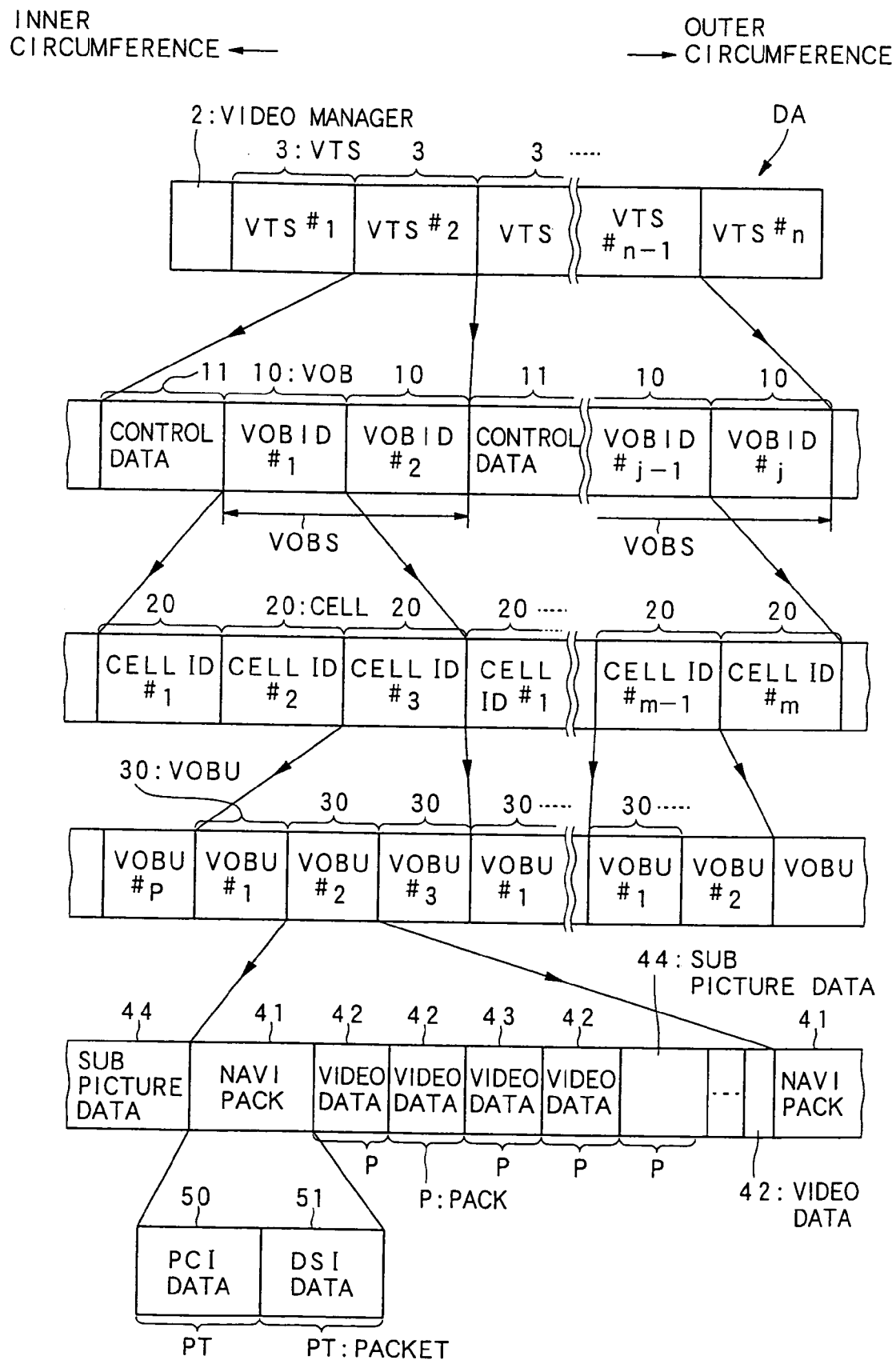
FIG. 2 is a diagram (I) for illustrating a physical format of the recording information according to the preferred embodiment.
Figure 3:
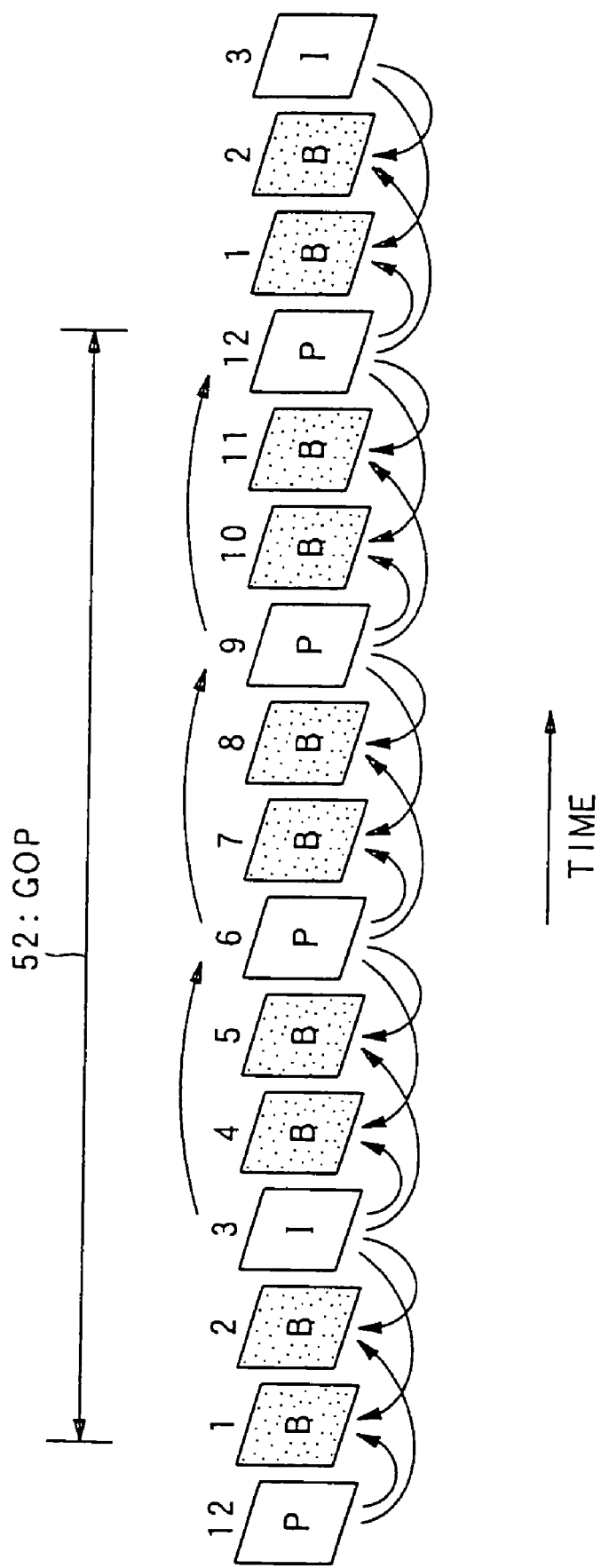
FIG. 3 is a diagram for illustrating a constitution of a GOP in the physical format according to the preferred embodiment.
Figure 4:
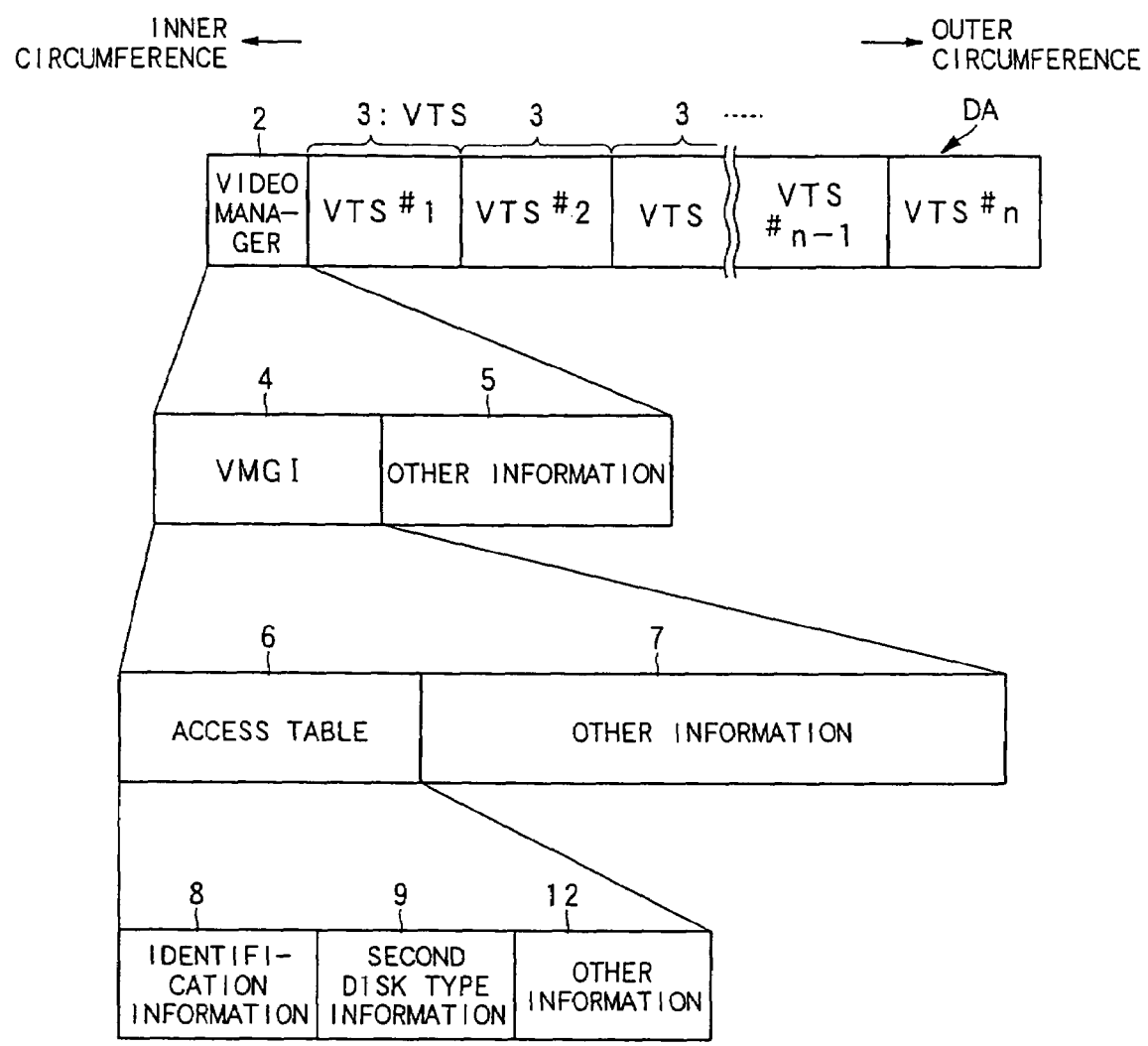
FIG. 4 is a diagram (II) for illustrating a physical format of the recording information according to the preferred embodiment.
Figure 5:
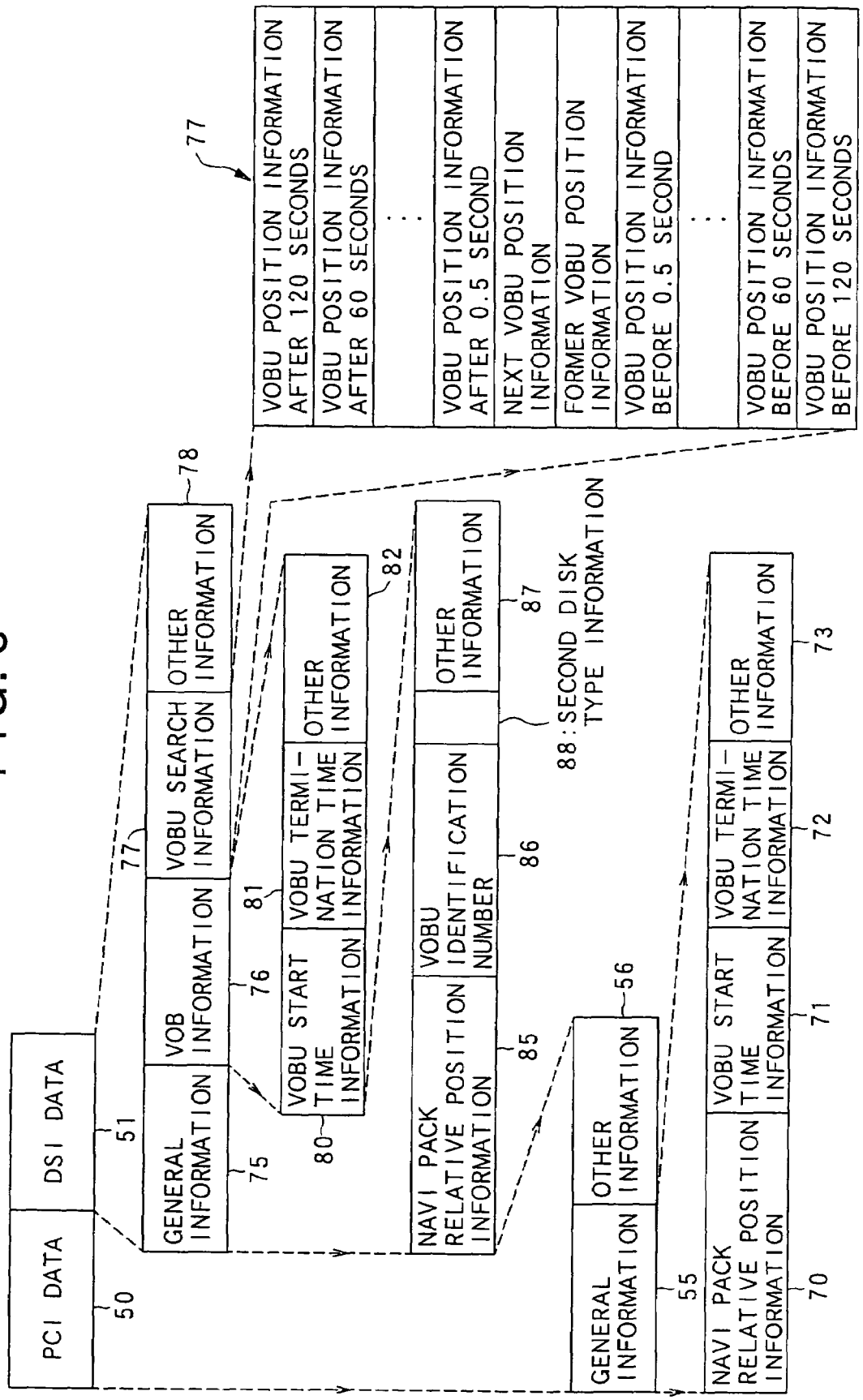
FIG. 5 is a diagram (III) for illustrating a physical format of the recording information according to the preferred embodiment.
Figure 6:
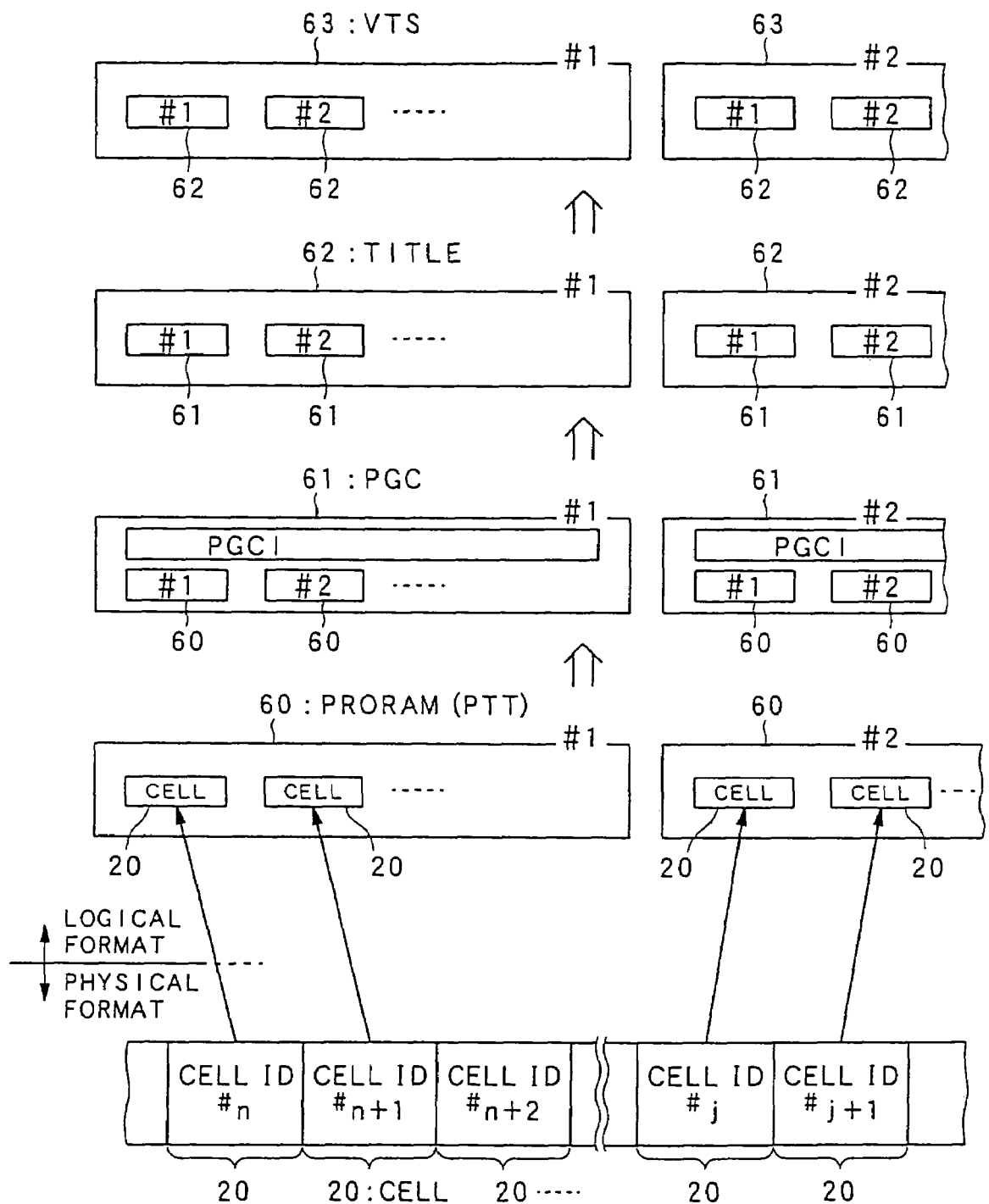
FIG. 6 is a diagram for illustrating a physical format of the recording information according to the preferred embodiment.

Alternatively, FIGS. 2, 4 and 5 hierarchically illustrate the physical format. FIG. 3 a constitution of a GOP (Group Of Picture) in the physical format. FIG. 6 hierarchically illustrates the logical format corresponding to the physical format.

The physical format explained below is a format with which not only the record information to be recorded in the DVD-R 1R but also the record information recorded in the DVD-ROM and the record information to be recorded in the DVD-RW and the DVD-RAM should be in conformity.

As shown in FIG. 2, image information and audio information are divided into a plurality of Video Title Sets (VTS) 3 (VTS #1 to VTS #n) having an ID (identification) number, respectively to be recorded.

The VTS means a set (a pack) packing image information and titles relevant to the image information, whose attributions such as the number of sound information and sub-picture information (i.e., the information of a sub-picture such as a subtitle of a movie or the like), a specification, and a corresponding language are identical. The titles are works such as movies, which producers intend to present to viewers. More specifically, for example, a plurality of movies, which correspond to one movie, having scripts of different languages and the like may be recorded in different titles respectively. Further, a movie of a theater version and the corresponding movie of a special version may be recorded in different titles respectively.

Alternatively, just before an area in which a VTS#1 in a VTS 3 is recorded, a video manager 2 is recorded. The details of the video manager will be explained later.

A piece of VTS 3 is divided into a plurality of VOBs 10 having ID numbers, respectively, to be recorded with control data 11 as a head. A portion composed of a plurality of VOBs 10 is referred to as a VOB set (VOBS) In order to distinguish the control data 11 as other data composing the VTS 3 and a plurality of VOBs 10 comprising an substance of the image information and the audio information, the substantial portion is referred to as a VOB set.

In the control data 11 to be recorded in a head of the VTS 3, the information such as PGCI (Program Chain Information) or the like comprising various information with regard to a program chain, which is a logical segment made by combining a plurality of cells (a cell will be described later) and the backup information for it are recorded as VTSI (Video Title Set Information). Alternatively, in each VOB 10, an substantial portion of the image information and the audio information (i.e., the image or the audio itself other than the control information) is recorded in addition to the control information.

Further, one piece of VOB 10 is composed of a plurality of cells 20 having an ID number, respectively. One piece of VOB 10 must be composed of integral multiples of the cells 20, so that one cell 20 is not shared by two pieces of VOB 10.

One cell 20 is composed of a plurality of VOB units (VOBU) 30 having an ID number, respectively. The VOB unit 30 means unit information including each of the image information, the audio information and the sub picture information.

Then, one VOB unit 30 is composed of: a navigation pack 41 (hereinafter, simply referred to as a navi pack) in which the control information to control the data or the like included in the VOB unit 30 is stored; video data 42 as the image information; audio data 43 as the audio information and sub picture data 44 as the sub picture information. Only the image data is recorded as the video data 42, and only the audio data is recorded as the audio data 43. Alternatively, as the sub picture data 44, only graphic data such as characters, a graphic as the sub picture are recorded. It is defined in the standard that there are eight kinds of audios capable of being recorded in the DVD-R 1R and there are thirty two kinds of the sub pictures capable of being recorded at the maximum.

Alternatively, the reproduction time (the reproduction time corresponding to the data recorded between one navi pack 41 and a navi pack 41 adjacent to this one navi pack 41) in response to one VOB unit 30 is recorded so as to have a length in the range of not less than 0.4 second and not more than 1.0 second. Therefore, the navi pack 41 is definitely detected one time in the range of 0.4 second to 1.0 second upon reproduction.

Additionally, in one VOB unit 30, the navi pack 41 should be located at a head thereof. However, each of the video data 42, the audio data 43 and the sub picture data 44 is not needed to be located in the VOB unit 30. Alternatively, if they are located in the VOB unit 30, the number and the order thereof may be arbitrarily set.

A segment of each of the video data 42, the audio data 43 and the sub picture data 44 shown in FIG. 1 is generally referred to as a pack P.

In other words, the video data 42, the audio data 43 and the sub picture data 44 are respectively divided into a pack P to be recorded in one VOB unit 30. Further, the pack P in which the video data 42 is recorded is referred to as a video pack, the pack P in which the audio data 43 is recorded is referred to as an audio pack, and the pack P in which the sub picture data 44 is recorded is referred to as a sub picture pack. Further, read-out starting time information referred to as a SCR (System Clock Reference) is recorded in a back header to be recorded in the head of each pack P. The SCR indicates a read-out start time on a reproduction time axis when the input in respective buffers should be started by reading out the data included in each pack P from a track buffer in the information reproducing apparatus for reproducing the information recorded in the DVD-R 1R. Alternatively, the video data 42, the audio data 43 or the sub picture data 44 is normally recorded in the above described each pack P for every packet as a recording unit obtained by further subsectioning the pack P. However, according to the DVD-R 1R of the present embodiment, one pack P is generally composed of one packet.

Finally, the navi pack 41 is composed of DSI data 51 comprising retrieval information for retrieving the image, the audio or the like to be reproduced and displayed (specifically, an address or the like on the DVD-R 1R in which the image, the audio or the like to be reproduced and displayed), and PCI data 50 comprising the information in relation to the reproduction displaying control upon displaying the image or the audio retrieved on the basis of the DSI data 51. The DSI data 51 and the PCI data 50 compose a DSI packet and a PCI packet as a packet PT, respectively, then, they are recorded.

Further, all of the video data 42 included in one VOB unit 30 are composed of one or plural Groups of Picture (GOP).

The DSI data 51 and the PCI data 50 will be described in detail later.

Alternatively, the PCI data 50 includes highlight information that defines the indication and the operation when the viewer selects a certain alternative item. Depending on the highlight information, for example, the change of the screen display with respect to the item selection in an image which displays the items to be selected by the viewer (menu screen), a display position to be changed in accordance with the selection, a command for the selected item (i.e., a command for indicating the operation to be carried out to the selected item) and the like are set.

The image information for displaying a frame, a selection button and the like, which are necessary for composing a menu image and displaying it, is recorded as the sub picture data 44 as the above described sub image information.

Additionally, the above described GOP is the minimum image unit by itself, which is defined in the MPEG (Moving Picture Expert Group) 2 system as an image compression system employed upon recording the image information in the DVD-R 1R of the present invention. In a head of each GOP, reproduction display time information referred to as a PTS (Presentation Time Stamp) is recorded to indicate the reproduction time on the reproduction time axis when the video data 42 included in the GOP should be displayed.

The summary of the MPEG 2 system will be explained below. Generally, there are many cases such that frame images located back and forth of one piece of frame image are similar each other and have a mutual relation in continuous frame images. The MPEG 2 system has views upon the point. In the MPEG 2 system, based on a plurality of frame images to be transferred at interval of some frames, another frame image existing among the plurality of frame images is generated by an interpolation calculation on the basis of a moving vector or the like of an original image. In the case, when recording another frame image, only by recording the information with regard to the difference among the plurality of frame images and the moving vector, it becomes possible to predict another frame image with reference to the recorded information and to reproduce another frame image upon reproduction. Therefore, it becomes possible to compress and record the image.

Further, the summary of the above described GOP will be explained with reference to FIG. 3. FIG. 3 illustrates an example of a plurality of frame images composing one GOP. FIG. 3 shows that one GOP 52 is composed of twelve pieces of frame images (the number of frame images included in one GOP 52 is not fixed in the MPEG 2 system). In the frame images, a frame image indicated by a reference numeral "I" is referred to as an I picture (Intra-coded picture) and it means a frame image capable of reproducing a complete frame image only by its own image. Alternatively, a frame image indicated by a reference numeral "P" is referred to as a P picture (Predictive-coded picture) and it means a predictive image generated by decrypting the difference among the compensated and reproduced predictive images or the like on the basis of the decrypted I picture or another P picture. Alternatively, a frame image indicated by a reference numeral "B" is referred to as a B picture (Bidirectionally predictive-coded picture) and it means a predictive image reproduced by using not only the decrypted I picture or P picture but also a future I picture or a future P picture recorded in an optical disc or the like for prediction. In FIG. 3, a predictive relation (interpolation relation) among respective pictures is represented by an arrow.

Alternatively, a general MPEG 2 system used in DVDs including the DVD-R 1R according to the present invention employs a variable rate system in which the data amount included in each GOP 52 is not fixed. In other words, respective pictures included in one GOP 52 correspond to a moving image with rapid movement, so that in the case that the mutual relation between respective pictures is small, the data amount for composing respective pictures becomes large. Accordingly, the data amount included in one GOP 52 also becomes large. On the other hand, respective pictures included in one GOP 52 correspond to a moving image with less movement, so that in the case that the mutual relation between respective pictures is large, the data amount for composing respective pictures becomes small and the data amount included in one GOP 52 also becomes small.

In the physical format having a hierarchical structure described in the above with reference to FIG. 2, respective segments are freely set by a manufacture of the record information in accordance with his or her intention to be recorded. By reproducing the information on the basis of a logical structure to be explained later for every segment, it is possible to carry out various and varied reproduction.

Next, the detail configuration of the video manager 2 will be explained with reference to FIG. 4.

At first, the video manager 2 is constituted by VMGI (Video Manager Information) 4 as the main content of the video manager 2 which serves as the information associated with a whole of the image information and the sound information, which are recorded in the DVD-R1R, and other information 5 as other appendant information 5.

In the next place, the VMGI4 is constituted by an access table 6 for accessing the above described respective titles, a menu to indicate the names of the above described respective titles as the other information and the information for preventing the illegal copy, and other information 7 including the back up information or the like of these information.

Additionally, within the access table 6, identification information 8, which is the identification information as the above described video manager 2, second disk type information 9, which is characteristic information of the invention to indicate an optical disk type of the DVD-R 1R as same as the above described first disk type information 145, and other information 12, which is the information other than these information, are included. The second disk type information 9 comprises the information of 2 bits, which is recorded together when the record information is recorded in the DVD-R1R to be described later (at this point, the second disk type information 9 is different from the above described first disk type information 145, which has been recorded in advance in the process of manufacturing). In the case that the second disk type information 9 is recorded in the DVD-R 1R, its value is set to be "10b".

Alternatively, within other information 12, the version information or the like to indicate a version number under a standard of the physical format, which has been currently explained, is included.

Alternatively, also in the DVD exclusively used for reproducing as other DVD and the above described DVD-RW and the DVD-RAM capable of recording the information, the above described second disk type information 9 and the second disk type information 88 to be described later are recorded. Specifically, as same as the above described first disk type information 145, values of the second disk type information 9 and the second disk type information 88 are set in such a manner that, if the DVD exclusively used for reproducing is used, the values become "00b", if the DVD-RAM is used, the values become "01b" and if the DVD-RW is used, the values become "11b", respectively.

A physical data structure of the above described DSI data 51 and the PCI data 50 will be described with reference to FIG. 5.

At first, as shown in FIG. 5, the PCI data 50 is comprised of general information 55 as the PCI data 50 itself and the other information 56 as the rest information.

Further, the general information 55 is composed of: navi pack relative position information 70 as relative recording address information from a head of the VOB 10 of the above described navi pack 41; VOBU reproduction start time information 71 for indicating a reproduction start time on the reproduction time axis of the VOB unit 30 in which this navi pack 41 is included; VOBU reproduction termination time information 72 for indicating a reproduction termination time on the reproduction time axis of the VOB unit 30; and other information 73 as the rest information.

The DSI data 51 is comprised of: general information 75 as the DSI data 51 itself; VOB information 76 as the information relevant to the VOB 10 to which the navi pack 41 belongs; VOBU search information 77 for indicating recording position on the DVD-R 1R of other VOB units 30 to be reproduced before and after the VOB unit 30 to which the navi pack 41 belongs is reproduced, and other information 78 as the rest information.

Then, the general information 75 is comprised of: navi pack relative position information 85 similar to the above described navi pack relative position information 70, VOBU identification number 86 for identifying the VOB unit 30 to which the navi pack 41 belongs, and other information 87 as the rest information.

Further, the VOB information 76 is comprised of: VOBU reproduction start time information 80 for indicating the reproduction start time on the reproduction time axis of the VOB 10 to which VOB unit 30 including the navi pack 41 belongs; VOBU reproduction termination time information 81 for indicating the reproduction termination time on the reproduction time axis of the VOB 10; and other information 82 as the rest information.

Still further, as the VOBU search information 77, as shown in FIG. 3, the position information is included as a list to indicate the position information for indicating a recording position on the DVD-R 1R of the VOB unit 30 next to the VOB unit 30 to which the navi pack 41 belongs, and a recording position on the DVD 1 of the VOB unit 30 one previous to the VOB unit 30 to which the navi pack 41 belongs, and the position information for indicating recording positions on the DVD-R 1R of other VOB units 30 to be reproduced in the rage of 120 seconds after the start time of the VOB unit 30 to 120 seconds before the start time of the VOB unit 30.

Of the above-explained each information, information for managing a manner of reproduction of the record information, such as the video manager 2, the control data 11, the navi pack 41, PTS in each pack header and the like, collectively means navigation information.

A logical format (a logical structure) obtained by combining the record information recorded by the physical segments shown in FIGS. 2, 4 and 5 will be explained with reference to FIG. 6. Alternatively, in the logical format shown in FIG. 6, the information is not actually recorded on the DVD-R 1R, but the information (the access information, the time information or the like) for combining, each data (specifically, the cell 20) shown in FIGS. 2, 4 and 5 and reproducing it in the logical structure shown in FIG. 6 is recorded on the DVD-R 1R, specifically, in the control data 11.

For a clear explanation, the explanation will be given from a lower hierarchy in FIG. 6. By selecting a plurality of cells 20 and combining them in the physical format explained above in FIG. 2, one program 60 is logically composed on the basis of the manufacture's intention. The program 60 is also the minimum logical unit capable of being accessed in such a manner that a system controller in the above described information recording/reproducing apparatus identifies the segment and uses a command. Alternatively, the manufacture may also define the program 60 as the minimum unit such that the viewer can freely select one cell 20 or packed plural cells 20 and views them. The unit is referred to as a PTT (Part of Title).

Alternatively, since one program 60 is logically composed by selecting a plurality of cells 20, it is also possible to use one cell 20 in a plurality of programs 60, in other words, redundant use of the cell 20 such that one cell 20 is reproduced in different and plural programs 60 is possible for the manufacturer.

The number of one cell 20 is treated as a cell ID number (it is represented by a cell ID# in FIG. 2) upon treating the cell 20 in the physical format shown in FIG. 2. On the other hand, the number of one cell 20 is treated as a cell number in the order of the description in a PGCI to be described later upon treating the cell 20 in the physical format shown in FIG. 6.

One PGC (Program Chain) 61 is logically composed on the basis of the manufacture's intention by combining a plurality of programs 60. In the unit of the PGC 61, the above described PGCI is defined. The present PGCI includes: a reproduction order of the cells 20 for each program 60 upon reproducing respective programs 60 (a specific program number is assigned for every program 60 by this reproduction order); an address as a recording position on the DVD-R 1R of respective cells 20; the number of a head cell 20 to be reproduced in one program 60; a reproduction system of respective programs 60; and various commands (a command capable of being designated by the manufacture for every PGC 61 or every cell 20). When recording the information in the DVD-R 1R according to the present embodiment, the manufacturer selects any one of reproduction methods among a normal reproduction, a random reproduction and a shuffle reproduction for every PGC 60 to reproduce the program 60 upon reproduction. The random reproduction is performed by using random numbers, so that the same program 60 may be possibly reproduced in plural times. The shuffle reproduction is also a random reproduction using random numbers similar to the above random reproduction, however, the program 60 is reproduced only once so that the same program 60 is not reproduced in plural times.

Alternatively, the recording position of the PGCI on the DVD-R 1R is located within the control data 11 (refer to FIG. 2) as described above. However, in the case that the PGCI is related to a menu within the video manager 2, the recording position of the PGCI is located within the control data (not shown) included in the video manager 2.

Alternatively, one PGCI 61 may include the data such as a substantial image, an audio and the like as a combination of the programs 60 (in other words, a combination of the cells 20) in addition to the above described PGCI.

Further, in one PGC 61, it is also possible to redundantly use the cell 20 as described in the explanation of the program 60 (namely, the same sell 20 is used by the different PGC 61).

Alternatively, the manufacturer is capable of selecting a method (a method for reproducing uncontinuously arranged cells) for reproducing the cells 20 regardless of the order that the cells 20 (for example, previously reproducing the cell 20 recorded lately or the like) are stored in the DVD-R 1R in addition to a method for reproducing the cells 20 in the order that they are stored in the DVD-R 1R (a method for reproducing continuously arranged cells) with respect to the cell 20 to be used.

One title 62 is logically composed of one or a plurality of PGC 61. For example, the title 62 is a unit corresponding to one piece of movie and the title 62 is information which the manufacturer wishes to provide to the viewer of the DVD-R 1R.

Then, one VTS 63 is logically composed of one or plural titles 62. This titles 62 included in the VTS 63 have common attribute, respectively. For example, with respect to one and the same movie, the movies having different languages correspond to respective titles 62. Alternatively, the information corresponding to one VTS 63 shown in FIG. 6 corresponds to the information included in one VTS 3 shown in FIG. 2. In other words, all information logically included in the VTS 63 shown in FIG. 6 are recorded in the DVD-R 1R as one VTS 3.

On the basis of the above described logical format, the manufacturer designates the record information segmented in the physical format, so that the title (a movie or the like) to be viewed by the viewer is formed.

(III) Embodiment of Information Recording/Reproducing Apparatus

An information recording/reproducing apparatus for recording the record information in a DVD-R 1R or a DVD-RW based on the above described physical format as well as reproducing the recorded information from the DVD-R 1R or the DVD-RW according to the present embodiment will be described with reference to FIGS. 7 to 10.

Figure 7:
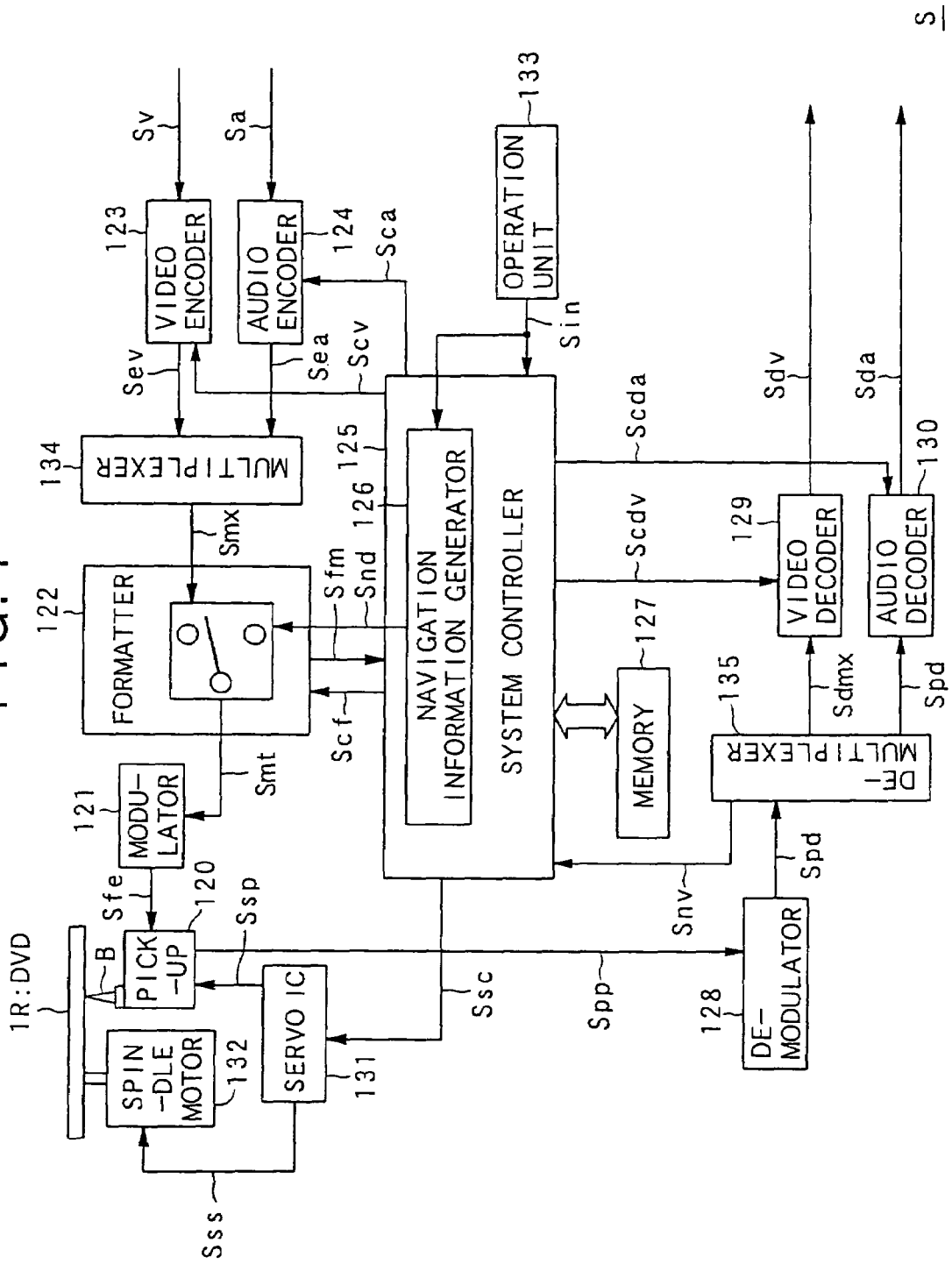
FIG. 7 is a block diagram for illustrating a schematic constitution of an information recording/reproducing apparatus according to the preferred embodiment.
Figure 8:
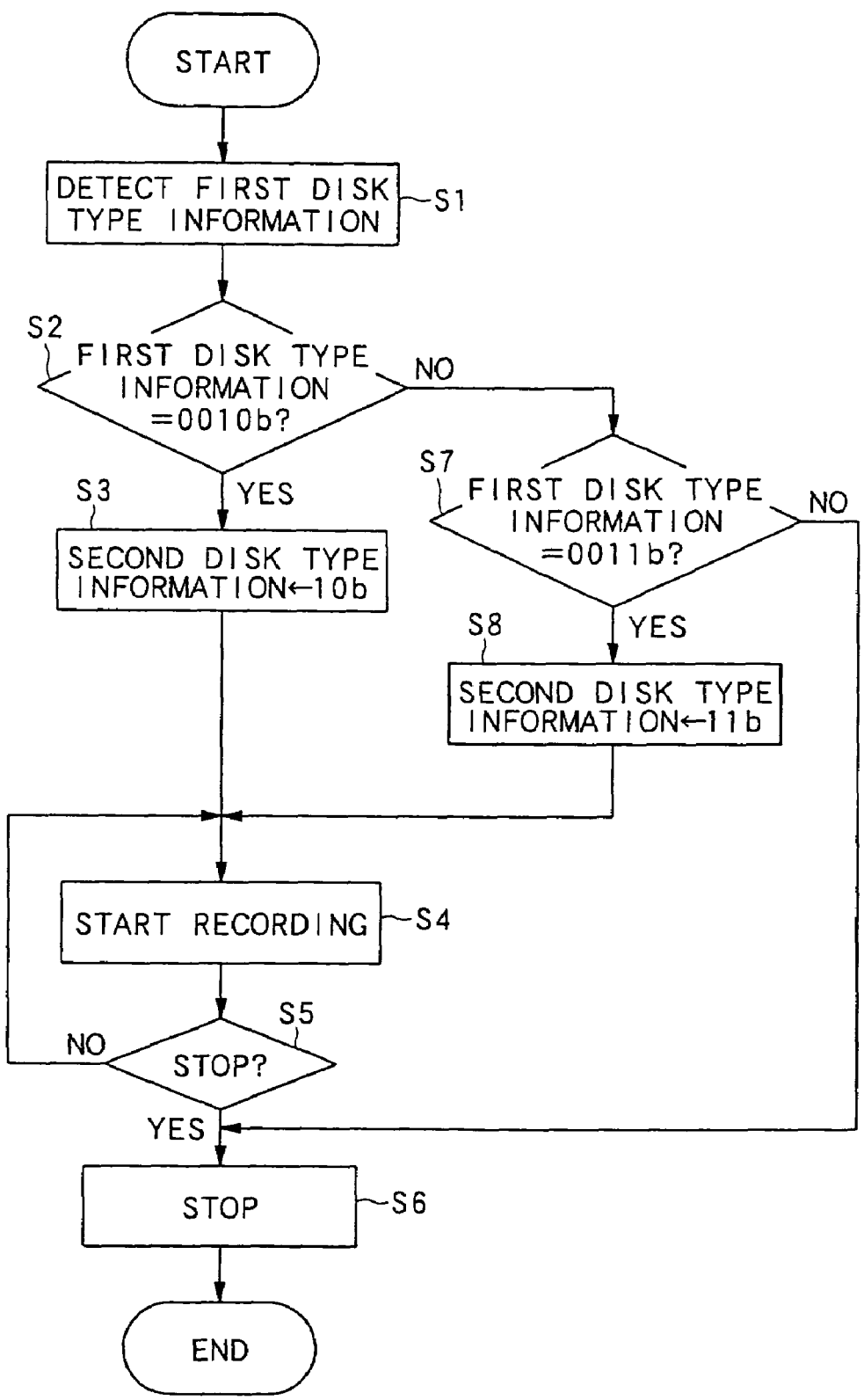
FIG. 8 is a flow chart for illustrating the information recording processing according to the preferred embodiment.
Figure 9:
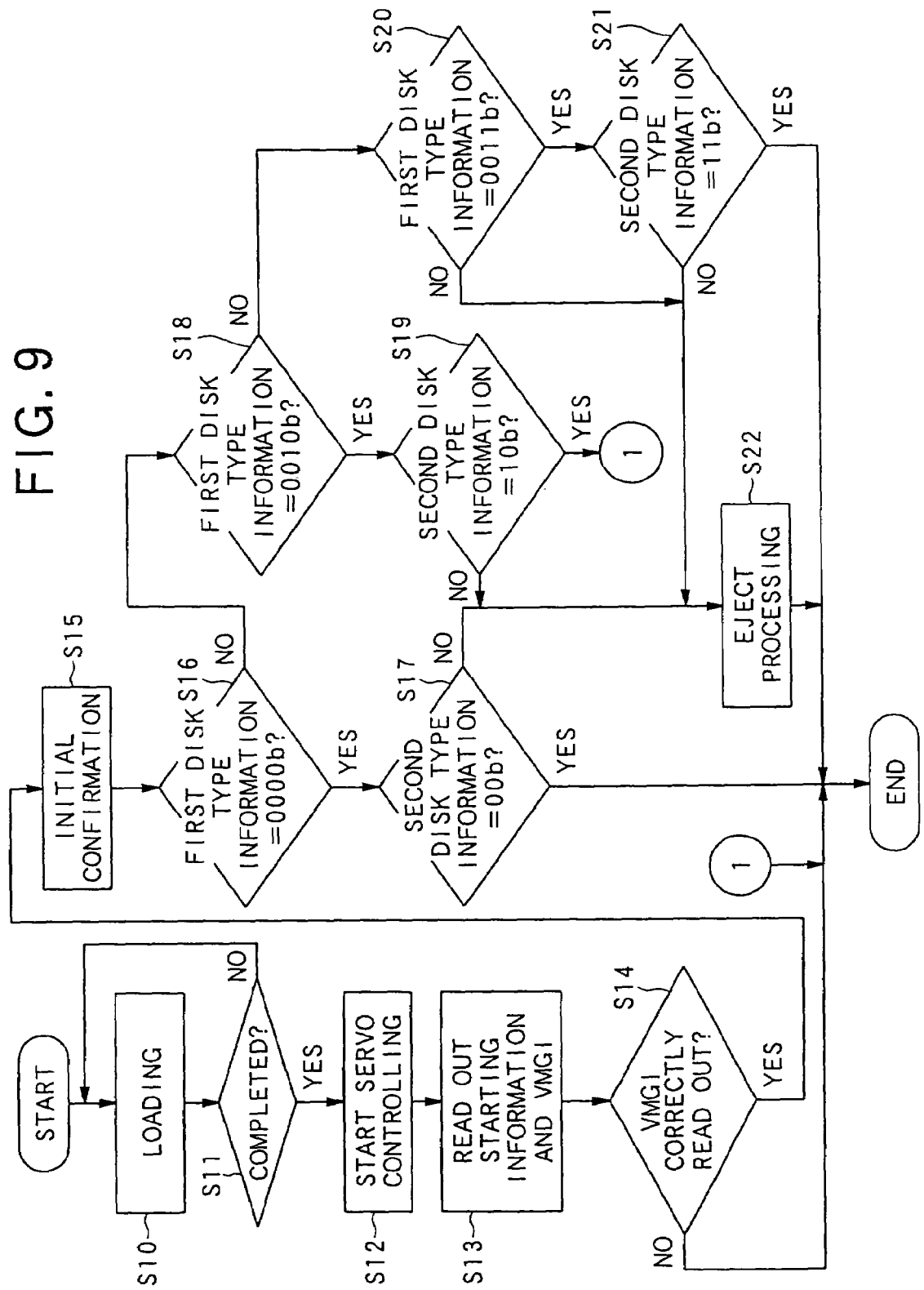
FIG. 9 is a flow chart for illustrating the loading processing according to the preferred embodiment.
Figure 10:
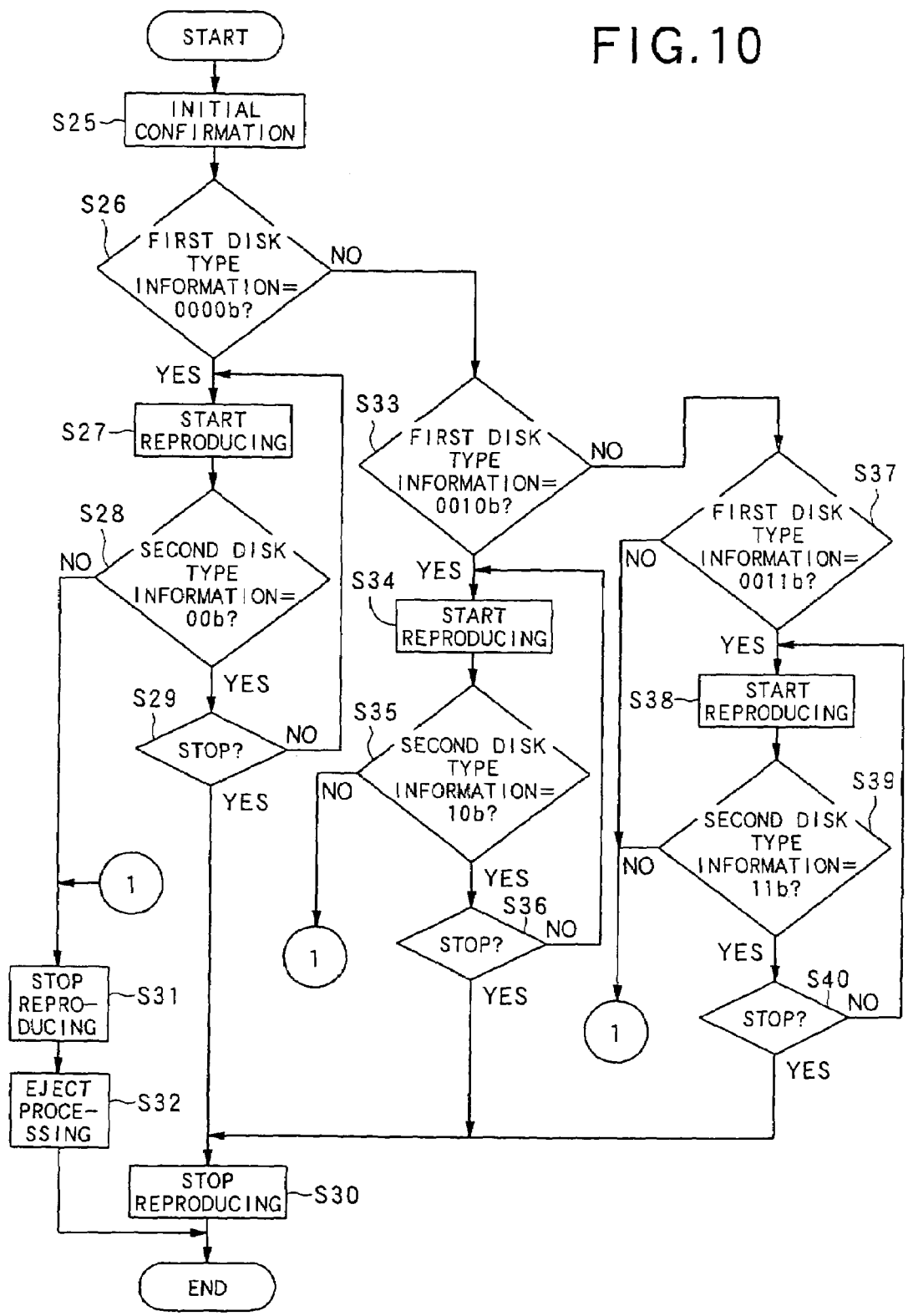
FIG. 10 is a flow chart for illustrating the information reproducing processing according to the preferred embodiment.

Alternatively, FIG. 7 is a block diagram for illustrating a schematic constitution of an information recording/reproducing apparatus according to the present embodiment. FIG. 8 is a flow chart for illustrating the information recording processing according to the present embodiment. FIG. 9 is a diagram for illustrating a loading processing executed upon executing the reproducing processing of the record information (namely, the loading processing for loading the DVD-R 1R or the DVD-RW in the information recording/reproducing apparatus according to the present embodiment). FIG. 10 is a flow chart for illustrating the information reproducing processing according to FIG. 10.

As shown in FIG. 7, an information recording/reproducing apparatus S according to the present embodiment is provided with: a pickup 120 as a recording device, a first detecting device and a second detecting device; a modulation unit 121; a formatter 122; a video encoder 123; an audio encoder 124; a system controller 125 as a type information recording device and a reproducing device; a memory 127; a demodulation unit 128; a video decoder 129; an audio decoder 130; a servo IC (Integrated Circuit) 131; a spindle motor 132; an operating unit 133; a multiplexer 134 and a demultiplexer 135. Alternatively, the system controller 125 is provided with a navigation information generator 126 for generating the above described navi pack 41 or the like.

The schematic operation of respective units will be explained.

At first, the spindle motor 132 rotates the loaded DVD-R 1R or DVD-RW in a predetermined rotation speed on the basis of a spindle control signal Sss from the servo IC 131.

On one hand, video information Sv as the recording information to be recorded in a data area DA of the DVD-R 1R or DVD-RW is inputted in the video encoder 123 after it is inputted from the outside.

Then, the video encoder 123 executes an encoding processing set in advance with respect to the video information Sv on the basis of the control signal Scv from the system controller 125, generates an encoded video signal Sev and outputs it to the multiplexer 134. Specifically, for example, the encoding processing is one in the above described MPEG 2 system.

On the other hand, audio information Sa as the recording information to be recorded in the data area DA of the DVD-R 1R or DVD-RW is inputted in the audio encoder 124 after it is inputted from the outside.

Then, the audio encoder 124 executes an encoding processing set in advance with respect to the audio information Sa on the basis of the control signal Sca from the system controller 125, generates an encoded audio signal Sea and outputs it to the multiplexer 134. Specifically, for example, the encoding processing is one in the above described MPEG 2 system.

Therefore, the multiplexer 134 superposes (or multiplexes) the image information and the audio information included in the encoded video signal Sev by a predetermined processing, generates a superposed signal Smx and outputs it to the formatter 122.

The multiplexer 134 makes the above described encoded audio signal Sea pass as it is and makes it into the superpose signal Smx.

The formatter 122 combines navigation information signal Snd to be described later from the navigation information generator 126 and the above described superposed signal Smx so as to be a system of the physical format shown in FIGS. 2, 4 and 5 on the basis of a control signal Scf from the system controller 125. Then, the formatter 122 generates a format signal Smt and outputs it to the modulation unit 121.

Respective recording information to be inputted in the formatter 122 as the superposed signal Smx are outputted to the system controller 125 as recording information signal Sfm in a preset timing so that they are provided for generating the above navigation information in the navigation information generator 126.

Then, the modulation unit 121 executes a predetermined modulation processing (specifically, for example, 8-16 modulation processing) to the format signal Smt, generates a modulation signal Sfe and outputs it to the pickup 120.

Therefore, the pickup 120 generates an optical beam B, of which density is modulated by the modulation signal Sfe, forms a pit corresponding to the above navigation information included in the modulation signal Sfe, and respective recording information on the information track by irradiating the generated optical beam B on the information track within the information recording surface (not shown) of the DVD-R 1R or DVD-RW. Then, the navigation information and respective recording information are recorded on the DVD-R 1R or DVD-RW in a system of the physical format shown in FIG. 1 and FIG. 3.

A deviation in a vertical direction with respect to the above information recording surface and a horizontal direction with respect to the above information recording surface between a converge position of the optical beam B and the above information track is solved by moving an objective lens (not illustrated) in the pickup 120 (an objective lens for converging the optical beam B) in the above horizontal direction and the above vertical direction on the basis of the pickup servo signal Ssp to be outputted from the servo IC 131, namely, by performing focus servo control and tracking servo control.

Therefore, the servo IC 131 generates the above spindle control signal Sss and the pickup servo signal Ssp on the basis of a control signal Ssc form the system controller 125 to output them to the spindle motor 132 and the pickup 120, respectively.

On one hand, in the case of reproducing the recording information or the like recorded in the DVD-R 1R or DVD-RW in advance, the pickup 120 generates an optical beam B with a predetermined density for reproduction to be irradiated to the information track on which the above pit is formed. Then, on the basis of this reflected light, the pickup 120 generates a detection signal Spp corresponding to the recording information or the like to output it to the demodulation unit 128.

Therefore, the demodulation unit 128 executes the demodulation processing in association with the demodulation processing in the above modulation unit 121 to the detection signal Spp, generates the demodulation signal Spd and outputs it to the demultiplexer 135.

Then, the demultiplexer 135 separates the image information and the audio information included in the video information when the demodulation signal Spd includes the video information, so that it generates a separated signal Sdmx to output it to the video decoder 129.

On one hand, in the case that the demodulation signal Spd includes the audio information, the demultiplexer 135 makes the demodulation signal Spd pass as it is and outputs it to the audio decoder 130.

The video decoder 126 executes the decoding processing corresponding to the encoding processing in the above video encoder 123 to the separated signal Sdmx on the basis of a control signal Scdv from the system controller 125, generates a decoding video signal Sdv and outputs it to a monitor (not shown) or the like in the outside.

Further, the audio decoder 130 executes the decoding processing corresponding to the encoding processing in the above audio encoder 124 to the modulation signal Spd including the audio information on the basis of a control signal Scda from the system controller 125, generates a decoding video signal Sda and outputs it to an amplifier (not shown) or the like in the outside.

On the other hand, the operating unit 133 generates an operational signal Sin corresponding to the operation and outputs it to the system controller 125 when the operation for carrying out the recording processing or the reproduction processing in the information recording/reproducing apparatus S is carried out by the user.

Further, the navigation information generator 126 generates the above navigation information signal Snd including the above respective navigation information to be recorded in the DVD-R 1R or DVD-RW upon recording processing to be described later on the basis of the control of the system controller 125 based on an operation signal Sin and the recording information signal Sfm and outputs the generated navigation information signal Snd to one of inputting terminals of the formatter 122.

Therefore, the above formatter 122 superposes the recording information in the superpose signal Smx and the navigation information in the navigation information signal Snd, so that the above format signal Smt including the recording information having the physical format shown in FIGS. 2, 4 and 5 is generated.

In parallel with these operations, the system controller 125 generates respective control signals Scv, Sca, Scf, Ssc, Scdv and Scda for controlling the respective operations to output them to the corresponding composing members, respectively, while giving and receiving necessary information to and from the memory 127 as a memory signal Sm. Further, the system controller 125 executes centralized control for a recording processing, a reproducing processing and the like described below.

(i) An Embodiment of Recording Processing

In the next place, the recording processing of the record information according to the embodiment will be specifically described with reference to the FIG. 8. Alternatively, the recording processing to be described below comprises the regular (not illegal) recording processing which is performed by loading a DVD-R 1R or DVD-RW (except for a DVD-RAM) serving as a DVD capable of recording the information in the information recording/reproducing apparatus S.

As shown in FIG. 8, according to the recording processing of the embodiment, if the above described DVD-R 1R or DVD-RW is loaded and the instruction for starting the recording processing is executed in an operating unit 133, at first, the above first class information 145, which has been recorded in advance in the loaded DVD-R 1R or DVD-RW, is detected (step S1).

In the next place, if its value is "0010b" to indicate the DVD-R 1R (step S2; YES) when a content of the detected first disk type information 145 (step S2) is confirmed, the above described second disk type information 9 (the second disk type information included in the VMGI 4) and the second disk type information 88 (the second disk type information included in the DSI data 51) are set in a navigation information generator 126 as "10b", respectively (step S3) so as to start the recording of the record information (step S4). According to the processing of this step S4, the record information including the above described first disk type information 145 and the second disk type information 9 and 88 are recorded within the loaded DVD-R 1R based on the physical format, which is shown in the above described FIGS. 1 to 5.

Alternatively, it is confirmed whether the operation to stop the recording processing is performed or not by the operating unit 133 (step S5). If the operation is not performed (step S5; NO), returning to the step S4, the recording processing is continued. On one hand, the stop operation is performed (step S5; YES), the recording processing is stopped at that point (step S6) to terminate a series of the recording processing.

On the other hand, in the case that a content of the detected first class information 145 is not "0010b" (step S2; NO) in the determination of the step S2, then, it is confirmed whether a content of the detected first disk type information 145 is "0011b" to indicate the DVD-RW or not (step S7).

Then, if the value of the detected first disk type information 145 is "0011b" (step S7; YES), the above described second disk type information 9 and 88 are set within the navigation information generator 126 as "11b", respectively (step S8), the recording of the record information is started (step S4) and the processing after the above described step S5 will be effected after that. In this case, according to the processing in this step S4, the recording information will be recorded within the loaded DVD-RW by the physical formats shown in the above described FIGS. 1 to 5.

Alternatively, according to the above described illegal recording processing, the processing in the steps S3 and S8 shown in FIG. 8 are not executed. As a result, in the optical disk, in which the illegal recording processing is performed, the content of the first disk type information 145 is different from the contents of the second disk type information 9 and 88 or the second disk type information 9 and 88 are definitely not recorded. More particularly, for example, in the case that the recording information, which is recorded in the DVD-ROM, is illegally copied in a bit-by-bit system in the DVD-R 1R, the second disk type information 9 and 88 are remained to be "00b" to indicate the DVD-ROM.

In the determination in the step S7, if the value of the detected first disk type information 145 is not "0011b" (step S7; NO), the value of the detected first disk type information 145 is not any one of "0010b" and "0011b". In this case, it is determined that the DVD currently loaded is the DVD-ROM, in which the value of the first disk type information 145 is "0000b", so that the recording processing is immediately terminated.

(ii) An Embodiment of Reproducing Processing

In the next place, the reproducing processing according to the embodiment for reproducing the recording information in the DVD-R 1R or DVD-RW in which the recording information is recorded by the recording processing shown in FIG. 8 will be specifically explained with reference to FIGS. 9 and 10.

(A) An Embodiment of Loading Processing

At first, the processing in the case that the DVD-R 1R or DVD-RW is loaded in the information recording/reproducing apparatus S upon reproducing the recording information will be described with reference to FIG. 9 below.

As shown in FIG. 9, in the loading processing according to the embodiment, at first, the DVD-R 1R or DVD-RW is inserted from a loading opening (not illustrated) within the information recording/reproducing apparatus S, so that the loading processing is started to fix a rotational axis of a spindle motor 132 by using a loading mechanism (not illustrated) (step S10).

Then, it is confirmed whether the loading of the DVD-R 1R or DVD-RW is completed or not (step S11). Then, if it is not completed (step S11; NO), the processing is returned to the step S10 again so that the loading processing is continued. On one hand, if the processing is completed (step S11; YES), then, rotation of the DVD-R 1R or DVD-RW and condense of an optical beam B is started via the above described respective servo controlling (step S12).

After that, the starting information or the like within the above described lead-in-area LIA (including the above described first class information 145) and the above described VMGI 4 are read out (step S13).

After that, it is confirmed whether the VMGI 4 is correctly read out or not in the step S13 (step S14) If it is not correctly read out (step S14, NO), it is assumed that the recording information which is recorded in the DVD-R 1R does not conform to the above described physical format. After notifying the user of this, the processing is shifted to the next reproducing processing.

On the other hand, if the VMGI 4 is correctly read out (step S14; YES), then, the initial confirmation such as confirmation of a version number of the physical format on the basis of the read out VMGI 4 is excuted (step S15). In the next place, the content of the above described first disk type information 145 that is read out (step S13) is confirmed. Then, it is confirmed whether its value is "0000b" to indicate the DVD exclusively used for reproducing or not (step S16).

Then, if the content of the first disk type information 145 is "0000b" (step S16; YES), it is consequently determined whether the above described second disk type information 9 in the VMGI 4 is "00b" or not (step S17).

Therefore, if the second disk type information 9 is "00b" (step S17; YES), it is supposed that the normal DVD exclusively used for reproducing is currently loaded in the information recording/reproducing apparatus S and the processing is shifted to the next reproducing processing.

On one hand, if the second disk type information 9 is not "00b" in the determination of the step S17 (step S17; NO), the type of the optical disk to be indicated by the first disk type information 145 and the type of the optical disk to be indicated by the second disk type information 9 are different each other in the optical disk which are currently loaded in the information recording/reproducing apparatus S, so that it is highly potential that this optical disk is formed by illegally copying the record information and this optical disk is immediately ejected to the outside of the information recording/reproducing apparatus S (step S22). Thus, the reproducing processing including the loading processing is completed.

On the other hand, if the content of the detected first disk type information 145 is not "0000b" in the determination of the step S16 (step S16; NO), then, it is confirmed whether its value is "0010b" to indicate the DVD-R 1R or not (step S18).

Further, if the content of the first disk type information 145 is "0010b" (step S18; YES), then, it is determined whether the above described second disk type information 9 is "10b" or not (step S19).

Therefore, when the second disk type information 9 is "10b" (step S19; YES), it is supposed that the normal DVD-R 1R is currently loaded in the information recording reproducing apparatus S and the processing is shifted to the next reproducing processing.

On one hand, if the second disk type information 9 is not "10b" in the determination of the step S19 (step S19; NO), the type of the optical disk to be indicated by the first disk type information 145 and the type of the optical disk to be indicated by the second disk type information 9 are different each other in the optical disk which are currently loaded in the information recording/reproducing apparatus S, so that it is supposed that this optical disk is formed by illegally copying the record information and this optical disk is immediately ejected to the outside of the information recording/reproducing apparatus S (step S22). Thus, the reproducing processing including the loading processing is completed.

On the other hand, if the content of the detected disk type information 145 is "0010b" in the determination of the step S18 (step S18; NO), then, it is confirmed whether its value is "0011b" to indicate the DVD-RW or not (step S20).

Further, if the content of the first disk type information 145 is "0011b" (step S20; YES), then, it is determined whether the above described second disk type information 9 is "11b" or not (step S21).

Therefore, the second disk type information 9 is "11b" (step S21; YES), it is supposed that the normal DVD-RW is currently loaded in the information recording/reproducing apparatus S and the processing is shifted to the next reproducing processing.

On one hand, if the second disk type information 9 is not "11b" in the determination of the step S21 (step S21; NO), the type of the optical disk to be indicated by the first disk type information 145 and the type of the optical disk to be indicated by the second disk type information 9 are different each other in the optical disk which are currently loaded in the information recording/reproducing apparatus S, so that it is supposed that this optical disk is formed by illegally copying the record information and this optical disk is immediately ejected to the outside of the information recording reproducing apparatus S (step S22). Thus, the reproducing processing including the loading processing is completed.

(B) An Embodiment of Reproducing Processing

In the next place, the reproducing processing according to the embodiment, which is executed in succession to the above described loading processing, will be explained with reference to FIG. 10.

As shown in FIG. 10, according to reproducing processing of the embodiment, at first, the above described starting information or the like and the VMGI 4 are read out from the optical disk, which is currently loaded within the information recording/reproducing apparatus S, and the initial confirmation such as confirmation of the version number of the physical format on the basis of the read out VMGI 4 is executed (step S25).

If the initial confirmation is completed, then, the content of the first disk type information 145 which is currently read out (step S25) is confirmed, so that it is confirmed whether its value is "0000b" to indicate the DVD-ROM or not (step S26).

If the content of the first disk type information 145 is "0000b" (step S26; YES), then, reproduction of the record information recorded in the DVD-ROM (detection from the optical disk) is started (step S27) and further, it is determined whether the above described second disk type information 88 within the DSI data 51 is "00b" or not (step S28).

Therefore, if the second disk type information 88 is "00b" (step S28; YES), it is supposed that the normal DVD-ROM is currently loaded in the information recording/reproducing apparatus S and the reproducing processing is continued. In the next place, it is confirmed whether the operation to stop the reproducing operation is executed or not by the operating unit 133 (step S29).

If the stop operation is not executed (step S29; NO), the processing is returned to the step S27 so as to continue the reproducing processing as well as the value of the second disk type information 88 in respective DSI data 51, which are sequentially obtained in accordance with the continuation of reproduction, is confirmed. On one hand, if the stop operation is executed (step S29; YES), the reproducing processing is stopped at that point (step S30) to complete a series of the reproducing processing.

On the other hand, if the second disk type information 88 is not "00b" in the determination of the step S28 (step S28; NO), the type of the optical disk to be indicated by the first disk type information 145 and the type of the optical disk to be indicated by the second disk type information 88 are different each other in the optical disk which are currently loaded in the information recording/reproducing apparatus S, so that it is highly potential that this optical disk is formed by illegally copying the record information and the reproducing processing for this optical disk is immediately stopped (step S31). Simultaneously, this optical disk is ejected to the outside of the information recording/reproducing apparatus S (step S32). Thus, the reproducing processing is completed.

Further, if the content of the detected first disk type information 145 is not "0000b" in the determination of the step S26 (step S26; NO), then, it is confirmed whether its value is "0010b" to indicate the DVD-R 1R or not (step S33).

If the content of the first disk type information 145 is "0010b" (step S33; YES), then, the reproduction of the record information which is recorded in the DVD-R 1R (detection from the optical disk) is started (step S34). Further, it is determined whether the above described second disk type information 88 is "10b" or not (step S35).

Therefore, if the second disk type information 88 is "10b" (step S35; YES), it is supposed that the normal DVD-R 1R is currently loaded in the information recording/reproducing apparatus S and the reproducing processing is continued. In the next place, it is confirmed whether the operation to stop the reproducing processing is executed or not by the operating unit 133 (step S36).

If the stop operation is not performed (step S36; NO), the processing is returned to the step S34 so as to continue the reproducing processing as well as the value of the second disk type information 88 in respective DSI data 51, which are sequentially obtained in accordance with the continuation of reproduction, is confirmed. On one hand, the stop operation is executed (step S36; YES), the reproducing processing is stopped at that point (step S30) to complete a series of the reproducing processing.

On the other hand, if the second disk type information 88 is not "10b" in the determination of the step S35 (step S28; NO), the type of the optical disk to be indicated by the first disk type information 145 and the type of the optical disk to be indicated by the second disk type information 88 are different each other in the optical disk which are currently loaded in the information recording/reproducing apparatus S, so that it is highly potential that this optical disk is formed by illegally copying the record information and the reproducing processing for this optical disk is stopped (step S31). Simultaneously, this optical disk is immediately ejected to the outside of the information recording/reproducing apparatus S (step S32). Thus, the reproducing processing is completed.

On one hand, if the content of the detected first disk type information 145 is "0010b" in the determination of the step S33 (step S33; NO), then, it is confirmed whether its value is "0011b" to indicate the DVD-RW or not (step S37).

If the content of the first disk type information 145 is "0011b" (step S37; YES), then, the reproduction of the record information which is recorded in the DVD-R 1R (detection from the optical disk) is started (step S38). Further, it is determined whether the above described second disk type information 88 is "11b" or not (step S39).

Therefore, if the second disk type information 88 is "11b" (step S39; YES), it is supposed that the normal DVD-RW is currently loaded in the information recording/reproducing apparatus S and the reproducing processing is continued. In the next place, it is confirmed whether the operation to stop the reproducing processing is executed or not by the operating unit 133 (step S40).

If the stop operation is not executed (step S40; NO), the processing is returned to the step S38 so as to continue the reproducing processing as well as the value of the second disk type information 88 in respective DSI data 51, which are sequentially obtained in accordance with the continuation of reproduction, is confirmed. On one hand, the stop operation is executed (step S40; YES), the reproducing processing is stopped at that point (step S30) to complete a series of the reproducing processing.

On the other hand, if the second disk type information 88 is not "11b" in the determination of the step S39 (step S39; NO), the type of the optical disk to be indicated by the first disk type information 145 and the type of the optical disk to be indicated by the second disk type information 88 are different each other in the optical disk which are currently loaded in the information recording/reproducing apparatus S, so that it is highly potential that this optical disk is formed by illegally copying the record information and the reproducing processing for this optical disk is immediately stopped (step S31). Simultaneously, this optical disk is ejected to the outside of the information recording/reproducing apparatus S (step S32). Thus, the reproducing processing is completed.

At the last, if the content of the detected first disk type information 145 is neither "0011b" in the determination in the step S37 (step S37; NO), it is supposed that the optical disk, which is currently loaded in the information recording/reproducing apparatus S, is an optical disk of a type that can not be reproduced in the information recording/reproducing apparatus S (for example, the DVD-RAM) and the reproducing processing for this optical disk is immediately stopped (step S31). Simultaneously, this optical disk is ejected to the outside of the information recording reproducing apparatus S (step S32) to complete the reproducing processing.

As described above, according to the recording processing and the reproducing processing in the information recording/reproducing processing of the embodiments, the second disk type information 9 and 88 having the same contents as that of the first disk type information 145, which is recorded in advance, are recorded in the DVD-R 1R or DVD-RW, in which the first disk type information 145 is recorded. After that, the recording information is recorded in the DVD-R 1R or DVD-RW. Further, when recording information is reproduced, the record information is reproduced only when the first disk type information 145 and the second disk type information 9 and 88 are equally related, so that it is possible to prohibit the illegal recording processing such that the second disk type information 9 or 88, which is different from the first disk type information 145, is recorded or to prohibit the reproduction of the record information, which is recorded by the illegal recording processing such that the second disk type information 9 or 88 is not recorded.

Alternatively, since the second disk type information 9 is recorded in the VMGI 4 and further, the second disk type information 88 is recorded in the DSI data 51, even if either one of the second disk type information 9 or 88 is interpolated, it is possible to certainly prohibit the reproduction of the recording information, which is recorded by the above described illegal recording processing, by using other one of the second disk type information 9 or 88.

(IV) Modified Embodiment of the Information Recording/Reproducing Apparatus

Next, a modified embodiment of the information recording/reproducing apparatus will explained with reference to FIGS. 11 to 14.

According to the above described embodiments, a case such that the second disk type information 9 and 88 take different values for every detailed type of a disk is explained. However, in addition to this, a value to classify two types of the optical disk such as the DVD-ROM and the recordable DVD, for example, a value of the second disk type information 9 or 88 corresponding to the DVD-ROM may be set to be "00b" and a value of the second disk type information 9 or 88 corresponding to the recordable DVD (namely, any one of the DVD-R, the DVD-RW or the DVD-RAM) may be set to be "01b".

In this case, if the value of the first disk type information 145 is "0000b" to indicate the DVD-ROM and the value of the second disk type information 9 or 88 is "01b" to indicate the recordable DVD, it is preferable that the reproduction of this optical disk is stopped and the this optical disk is ejected to the outside since it is highly potential that this optical disk is formed by illegally copying the record information from the DVD-ROM to the recordable DVD.

On one hand, if the value of the first disk type information 145 is "0000b" to indicate the DVD-ROM and the value of the second disk type information 9 or 88 is also "00b" to indicate the DVD-ROM, or if the value of the first disk type information 145 is any one of "0001b", "0010b" or "0011b" to indicate the recordable DVD and the value of the second disk type information 9 or 88 is also "01b" to indicate the recordable DVD, the record information recorded in this optical disk is supposed to be normal and the reproduction thereof is performed.

Next, the operation of the information recording/reproducing apparatus according to the modified embodiment will be explained in detail.

Figure 11:
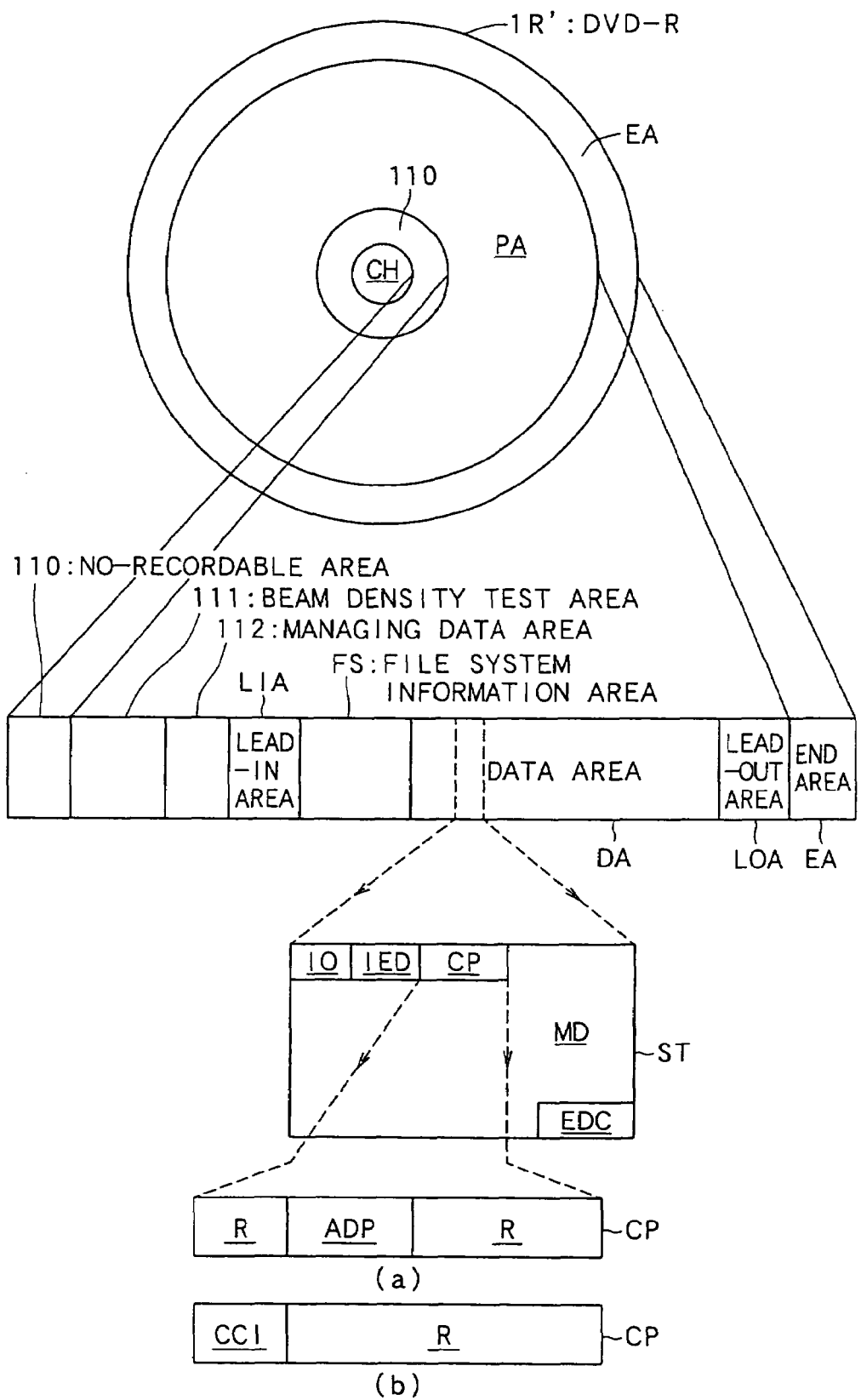
FIG. 11 is a plane outline diagram of a DVD-R according to a modified embodiment and a diagram for illustrating a physical recording format such that the recording of the recording information is completed.

By using a DVD-R having a different structure from the DVD-R 1R, which is used in the information recording/reproducing apparatus S according to the above-mentioned embodiment, the operation of the information recording/reproducing apparatus according to the modified embodiment will be explained below. Therefore, at first, the structure of the DVD-R will be explained with reference to FIG. 11. FIG. 11 illustrates a plan external view and a physical recording format of the DVD-R after recording the record information is completed, according to the modified embodiment.

As shown in FIG. 11, a DVD-R 1R' according to the modified embodiment is provided with a non-recording area 110, a beam strength test area 111, a managing data area 112, a lead-in area LIA, a file system information area FS, a data area DA, a lead-out area LOA and a terminal area EA as same as the DVD-R 1R according to the above described embodiment. Further, the record information recorded in the data area DA is structured in such a manner that a plurality of sector information is continued as a unit of information ST.

Then, one of sector information ST is comprised of: identification information ID for identifying the present sector information ST itself within the record information; error correcting information IED for correcting the detection error of the present identification information ID upon reproducing the record information; characteristic information CP for indicating a characteristic belonged to the information, which is included in the present sector information ST; main information MD as the information included in the present sector information ST itself; and error detecting information EDC for detecting the detection error of entirety of the sector information ST upon reproducing the recording information in sequence from a head address thereof.

In this case, in the structure of the characteristic information CP, when the DVD-R 1R' comprises a DVD-R 1R' to be generally circulated (hereinafter, the DVD-R 1R' is merely referred to as a G (General) type DVD-R), as shown in the symbol (a) of FIG. 11, according to its address structure, the above described characteristic information CP is comprised in such a manner that, data type information ADP, which indicates whether the record information recorded in the G type DVD-R 1R' comprises the video information mainly composed of the image information or not, exists between two preparatory information R without any significant information (hereinafter, a structure of the characteristic information CP shown in the symbol (a) of FIG. 11 is referred to as a second format).

On the contrary, if for example the DVD-R 1R' comprises a DVD-R 1R' (hereinafter, the DVD-R 1R' is merely referred to as an A (Authoring) type DVD-R) to be used only by a producer of the record information for the user of a test or the like, as shown in symbol (b) of FIG. 11, according its address structure, the present characteristic information CP includes the copy right information CCI (namely, the copy right information to indicate the number of times that the record information recorded in the A type DVD-R 1R' is capable of being copied and the reproduction limitation state or the like of the record information recorded in the A type DVD-R 1R') at its head. Further, the interior of the characteristic information CP other than the copy right information CCI is defined as the preparatory information R, which does not include any significant information (hereinafter, a structure of the characteristic information CP shown in symbol (b) of FIG. 11 is referred to as a first format).

Alternatively, with respect to the above described characteristic information CP, other than the above described G type DVD-R 1R', the structure of the characteristic information CP within the record information recorded in the DVD-RW and the DVD-RAM is defined as the above described second format. On the other hand, the structure of the characteristic information CP in the record information recorded in the DVD-ROM other than the above described A type DVD-R is defined as the above described first format. Alternatively, specifically, a content of the above described data type information ADP is defined as "01b" when the record information recorded in the DVD, in which the data type information ADP is recorded, is the video information. On the other hand, if this record information is not the video information (for example, this record information comprises only the audio information such as the music information), a content of the above described data type information ADP is defined as "00b".

In the next place, by using the DVD-R 1R' having the above described structure, the operation of an information recording reproducing apparatus according to the modified embodiment will be explained.

(i) A Modified Embodiment for Recording Processing

In the next place, the recording processing of the record information in the information recording/reproducing apparatus according to the modified embodiment will be specifically explained with reference to FIG. 12. Alternatively, the recording processing to be explained below comprises normal (not illegal) recording processing to be executed as a DVD capable of recording the information (namely, any DVD capable of recording the information including the above described DVD-R 1R' and the DVD-RAM) is loaded in the information recording/reproducing apparatus according to the modified embodiment.

Figure 12:
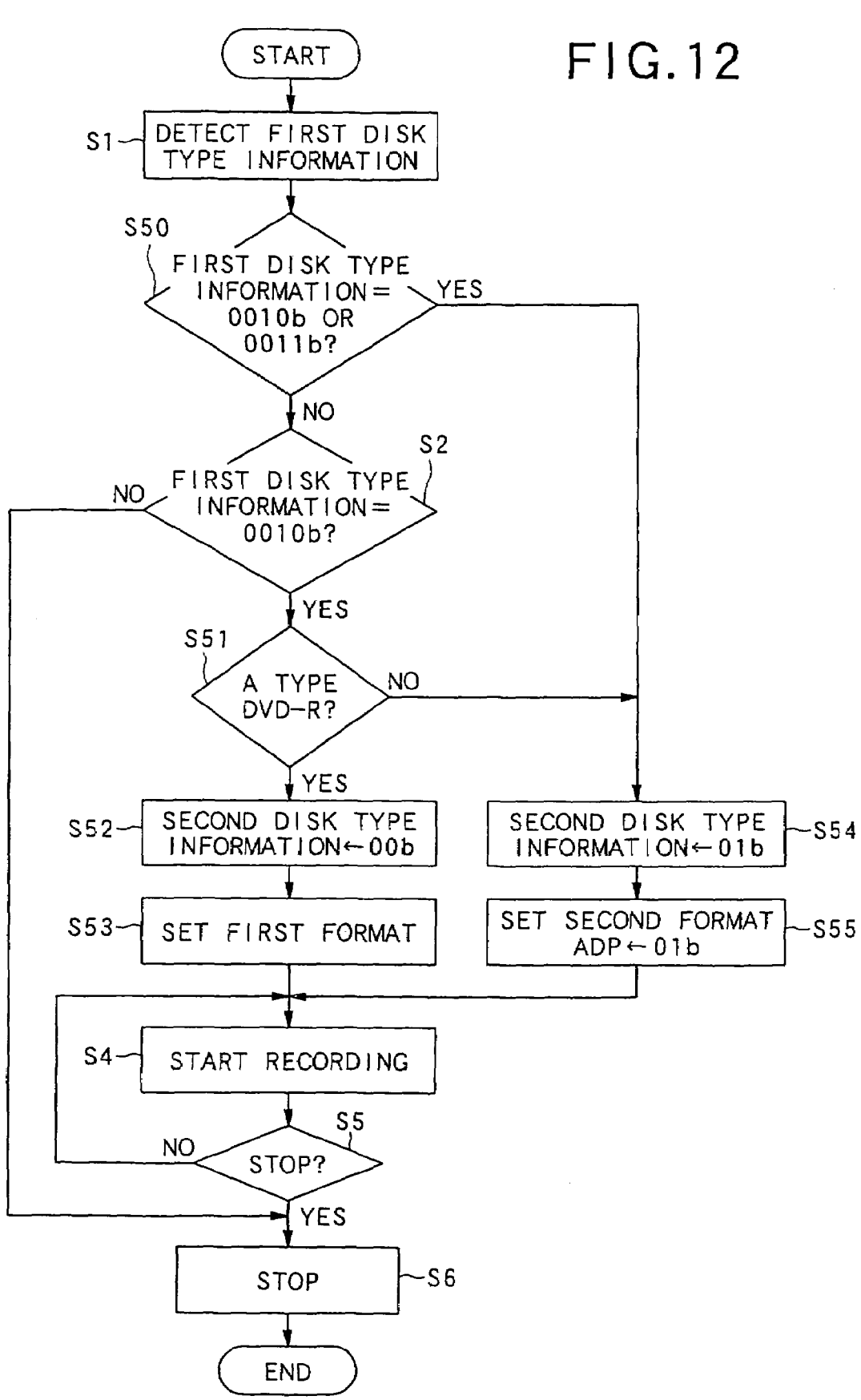
FIG. 12 is a flow chart for illustrating the information recording processing according to the modified embodiment.

Alternatively, FIG. 12 is a flow chart for illustrating the recording processing. With respect to the same operation as the recording processing in the information recording/reproducing apparatus S according to the above described embodiment with reference to FIG. 8, the identical step numerals are given and the detailed explanations thereof are omitted.

As shown in FIG. 12, in the recording processing according to the modified embodiment, if the above described DVD-R 1R' or the like is loaded and the instruction to start the recording processing is executed by an operating unit 133, at first, the first disk type information 145 which has been already recorded in the present loaded DVD-R 1R' or the like is detected as same as the above described embodiment (step S1).

In the next place, a content of the detected first disk type information 145 is confirmed (step S50). Then, if its value is "0011b" to indicate that the loaded DVD is a DVD-RW or its value is "0001b" to indicate that the loaded DVD is a DVD-RAM (step S50; YES), the second disk type information 9 (the second disk type information included in the VMGI 4) and the second disk type class information 88 (the second disk type information included in the DSI data 51) are set as "01b", respectively, in a navigation information generator 126 (step S54). Further, a content of the characteristic information CP is set as the above described second format as well as the data type information ADP is set as "01b" in the navigation information generator 126 (step S55) and the recording of the record information is started in the same way as the above described embodiment (step S4).

On one hand, under the determination in the above described step S50, if a content of the first disk type information 145 is not "0011b" nor "0001b" (step S50; NO) then, it is confirmed whether a content of the first disk type information 145 is "0010b" to indicate the loaded DVD is a DVD-R 1R' or not (step S2). If the content is "0010b" (step S2; YES), then, it is confirmed whether this DVD-R 1R' is the above described A type DVD-R or not (step S51). If it is not the A type DVD-R (step S51; NO), the processing is shifted to the above described step S54 and S55 as it is.

On the other hand, under the determination in the step S51, if the loaded DVD-R 1R' is the A type DVD-R (step S51; YES), the second disk type information 9 and 88 are set as "00", respectively, in the navigation information generator 126 (step S52). Further, a content of the characteristic information CP is set as the above described first format in the navigation information generator 126 (step S53) and the recording of the record information is started (step S4).

In step S52 shown in FIG. 12, the second disk type information 9 and 88 are set as "00b", which originally indicates the DVD-ROM, even though the DVD loaded in the information recording/reproducing apparatus of the modified embodiment is the A type DVD-R. That is because this A type DVD-R is not sold to a consumer but used only for a test upon producing the DVD-ROM, so that it is supposed that it is enough that A type DVD-R functions only as the DVD-ROM in terms of the DVD for the test.

Then, it is confirmed whether the operation to stop the recording processing is performed in the operating unit 133 or not (step S5). If it is not performed (step S5; NO), the processing returns to the step S4 to continue the recording processing. On one hand, if the stop operation is performed (step S5; YES), the recording processing is stopped (step S6) at this point and a series of recording processing is terminated.

On the other hand, under the determination of the step S2, if a content of the detected first disk type information 145 is not "0010b" (step S2; NO), it turns out that a content of the first disk type information 145 is not any one of "0001b", "0010b" and "0011b". In this case, since a DVD which is loaded at present is the DVD-ROM (namely, a DVD to indicate that a content of the first disk type information 145 is "0000b"), the recording processing is immediately stopped.

Alternatively, in the above described illegal recording processing, the processing in the steps S52 and S54 shown in FIG. 12 are not performed. As a result, in an optical disk, in which the present illegal recording processing is performed, as same as the above described embodiment, a content of the first disk type information 145 is different from a content of the second disk type information 9 and 88 or the second disk type information 9 and 88 are not recorded at all.

(ii) An Embodiment of the Reproducing Processing

In the next place, the reproducing processing according to the modified embodiment to reproduce the recording information in a DVD-R 1R' or DVD-RW, in which the present record information is recorded by the recording processing shown in FIG. 12, will be specifically explained with reference to FIG. 13 and FIG. 14.

(A) A Modified Embodiment of the Loading Processing

At first, upon reproducing the recording information, the processing in the case that the DVD-R 1R' or DVD-RW is loaded in the information recording reproducing apparatus according to the modified embodiment will be explained with reference to FIG. 13 below.

Figure 13:
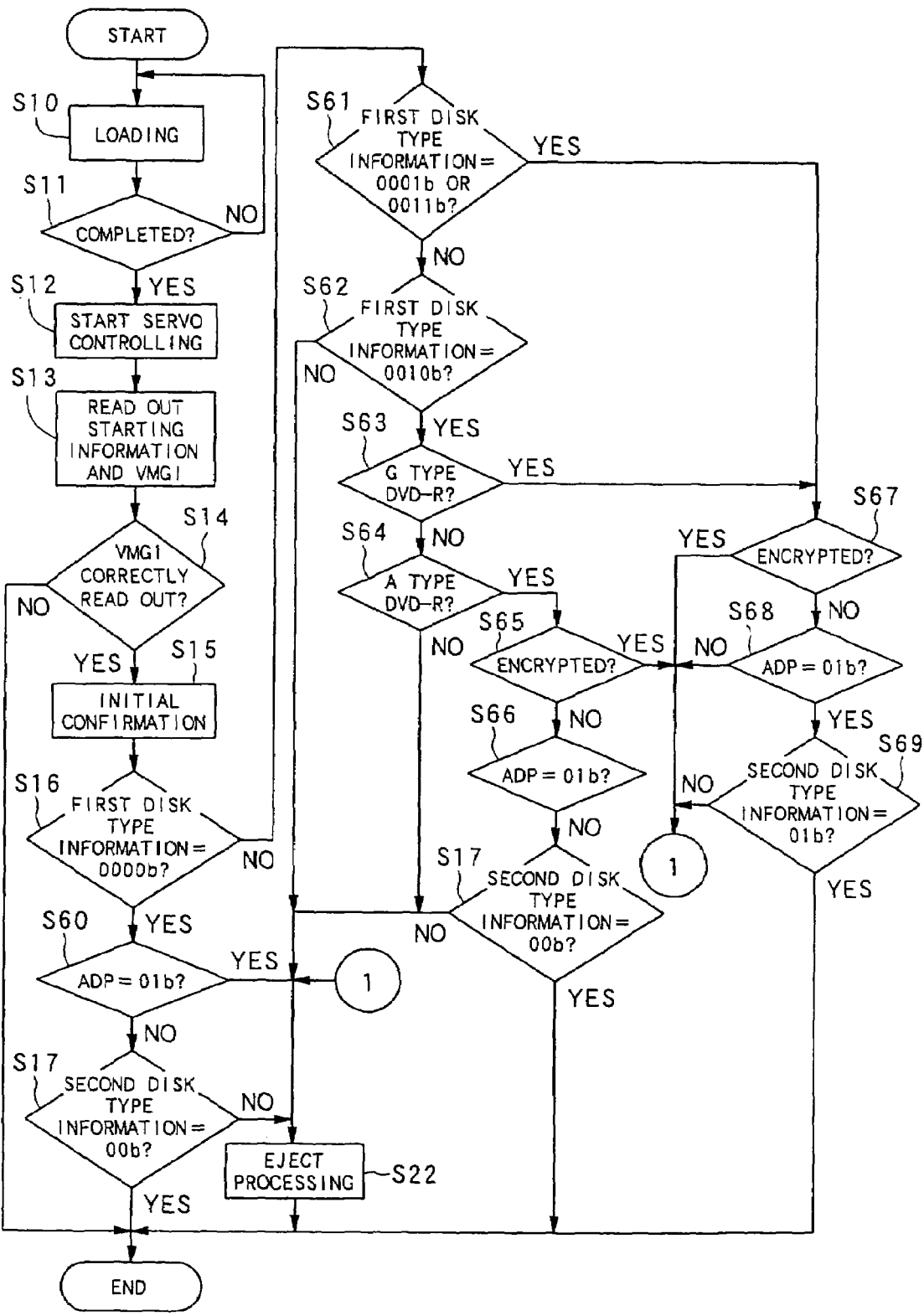
FIG. 13 is a flow chart for illustrating the loading processing according to the modified embodiment.

Alternatively, FIG. 13 is a flow chart for illustrating the present loading processing. With respect to the same operation as the loading processing in the information recording/ reproducing apparatus S according to the above described embodiment with reference to FIG. 9, the identical step numerals are given and the detailed explanations thereof are omitted.

As shown in FIG. 13, in the loading processing according to the modified embodiment, at first, the processing from the loading processing (step S10) among the loading processing according to the embodiment, which was explained with reference to FIG. 9, to the confirming processing of a content in the first disk type information 145 (step S16) are performed.

In the next place, under the determination of the step S16, if a content of the first disk type information 145 is "0000b" (step S16; YES), the present loaded DVD is the DVD-ROM. Then, the above described characteristic information CP is extracted from the sector information ST in the recording information recorded in the DVD-ROM and it is confirmed whether a content of the above described data type information ADP, which is included in the characteristic information CP, is "01b" or not (step S60).

Further, if a content of the confirmed data type information ADP is "01b" (step S60; YES), since the data type information ADP is originally not defined by the DVD-ROM and the A type DVD-R (refer to FIG. 11), it is originally impossible that a content of the first disk type information 145, which is confirmed in the step S16, is "0000b" and its data type information ADP is "01b". Therefore, in this case, it is assumed that an optical disk, in which any illegal processing is performed, is probably loaded at present, so that this optical disk is immediately ejected from the information recording/reproducing apparatus (step S22) and the reproducing processing including the loading processing is terminated.

On one hand, under the determination of the step S60, if a content of the confirmed data type information ADP is not "01b" (step S60; NO), in this case, it is assumed that a normal DVD-ROM is loaded at present, and then, it is determined that the above described second disk type information 9 in the VMGI 4 is "00b" or not (step S17).

Therefore, if the second disk type information 9 is "00b" (step S17; YES), it is assumed that the normal DVD-ROM is loaded in the information recording/reproducing apparatus S at present, so that the loading processing is terminated to shift to the next reproducing processing.

On one hand, under the determination of the step S17, if the second disk type information 9 is not "00b" (step S17; NO), it is assumed that a class of the optical disk which is indicated by the first disk type information 145 is different from a type of the optical disk which is indicated by the second disk type information 9 in the present loaded optical disk and this optical disk is highly possibly formed by illegally copying the record information therein, so that this optical disk is immediately ejected from the information recording/reproducing apparatus (step S22) to terminate the reproducing processing including the loading processing.

On the other hand, under the determination of the step S16, if a content of the detected first disk type information 145 is not "0000b" (step S16; NO), then, it is confirmed whether its value is "0011b" to indicate a DVD-RW or "0001b" to indicate a DVD-RAM or not (step S61).

In the next place, under the determination of the step S61, if a content of the first disk type information 145 is not "0001b" or "0011b" (step S61; NO), then, it is confirmed whether its value is "0010b" to indicate a DVD-R 1R' or not (step S62).

Further, if a content of the first disk type information 145 is "0010b" (step S62; YES), then, it is confirmed whether the present loaded DVD-R 1R' is a G type DVD-R or not (step S63).

Alternatively, if a content of the first disk type information 145 is neither "0010b" (step S62; NO), the present loaded DVD is a DVD, which is not belonged to any normal type, so that, in this case, it is assumed that the present optical disk is an unauthentic optical disk and this optical disk is immediately ejected from the information recording/reproducing apparatus (step S22) to terminate the reproducing processing including the loading processing.

In the next place, under the determination of the step S63, if the present loaded DVD-R 1R' is not the G type DVD-R (step S63; NO), further, it is confirmed whether the present DVD-R 1R' is the A type DVD-R or not (step S64).

Further, if the present loaded DVD-R 1R' is neither the A type DVD-R (step S64; NO), the present loaded DVD-R1R' is neither the G type DVD-R nor the A type DVD-R despite that the present loaded DVD-R 1R' is determined to be a DVD-R 1R'. Therefore, in this case, assuming that the present optical disk is highly possibly formed by illegally copying the record information therein, this optical disk is immediately ejected from the information recording/reproducing apparatus (step S22) to terminate the reproducing processing including the loading processing.

On one hand, if the present loaded DVD is the A type DVD-R under the determination of the step S64 (step S64; YES), then, it is confirmed whether the encryption processing is provided to the record information recorded in the present loaded A type DVD-R or not (step S65). If it is encrypted (step S65; YES), assuming that its record information is protected by the copyright and this record information should not be reproduced, the present loaded DVD-R 1R' is immediately ejected from the information recording/reproducing apparatus (step S22) to terminate the reproducing processing including the loading processing. On the other hand, if it is not encrypted (step S65; NO), then, the above described characteristic information CP is extracted from the sector information ST in the record information recorded in the present loaded A type DVD-R and it is confirmed whether a content of the above described data type information ADP included in the characteristic information CP is "01b" or not (step S66).

Further, if the content of the confirmed data type information ADP is "01b" (step S66; YES), as described above, since the data type information ADP is not defined by the DVD-ROM and the A type DVD-R (refer to FIG. 11), it is not originally impossible that the content confirmed in the step S64 is the A type DVD-R as well as its data type information ADP is "01b". Therefore, in this case, assuming that the present loaded DVD-R is probably an optical disk provided with any illegal processing, this optical disk is immediately ejected from the information recording/reproducing apparatus (step S22) to terminate the reproducing processing including the loading processing.

On one hand, under the determination of the step S66, if the content of the confirmed data type information ADP is not "01b" (step S66; NO), assuming that the normal A type DVD-R is loaded at present in this case, then, it is determined whether the second disk type information 9 in the VMGI 4 is "00b" or not (step S17).

Therefore, if the second disk type information 9 is not "00" (step S17; NO), it is assumed that the normal A type DVD-R is loaded in the information recording/reproducing apparatus at present to shift to the next reproducing processing.

On one hand, under the determination of the step S17, if the second disk type information 9 is "00b" (step S17; YES), in the present loaded optical disk, a type of the DVD, which is indicated by the first disk type information 145, is different from the type of the DVD, which is indicated by the second disk type information 9, so that this DVD is highly possibly an optical disk formed by illegally copying the record information therein. Then, this optical disk is immediately ejected from the information recording/reproducing apparatus (step S22) and the reproducing processing including the loading processing is terminated.

In step S17 shown in FIG. 13, the same determination as that of step S7 in FIG. 9 is performed, even though the DVD, which is loaded in the information recording/reproducing apparatus of the modified embodiment and is the object of the determination, is the A type DVD-R. That is because this A type DVD-R is not sold to a consumer but used only for a test upon producing the DVD-ROM, so that it is supposed that it is enough that A type DVD-R functions only as the DVD-ROM in terms of the DVD for the test.

On the other hand, under the determination of the above described step S61, if a content of the first disk type information 145 is any of "0001b" or "0011b" (step S61; YES) or under the determination of the above described S63, if the present loaded DVD-R 1R' is confirmed to be the G type DVD-R (step S63; YES), then, it is confirmed whether the encryption processing is provided to the record information recorded in respective DVD or not (step S67). Further, if it is encrypted (step S67; YES), assuming that its record information is protected by the copyright and this record information should not be reproduced, this optical disk is immediately ejected from the information recording/reproducing apparatus (step S22) to terminate the reproducing processing including the loading processing. On one hand, if it is not encrypted (step S67; NO), then, the above described characteristic information CP is extracted from the sector information ST in the record information recorded in the present loaded DVD and it is confirmed whether a content of the above described data type information ADP is "01b" or not (step S68).

Then, if the content of the confirmed data type information ADP is not "01b" (step S68; NO), as described above, since the data type information ADP is defined only in the case that the video information is recorded in the DVD-RW, the DVD-RAM or the G type DVD-R (refer to FIG. 11), the content which is confirmed in the step S61 or the step S63 is not identical with the content which is confirmed in the step S68. Therefore, in this case, assuming that the present loaded optical disk is probably an optical disk provided with any illegal processing, this optical disk is immediately ejected from the information recording reproducing apparatus (step S22) to terminate the reproducing processing including the loading processing.

On one hand, if the content of the confirmed data type information ADP is "01b" (step S68; YES), it is perceived that the content, which is confirmed in the step S61 or the step S63, is appropriate as the normal DVD-RW, DVD-RAM or DVD-R, so that, in the next place, it is determined whether the above described second disk type information 9 is "01b" or not (step S69).

Therefore, if the second disk type information 9 is "01b" (step S69; YES), it is assumed that any one of the G type DVD-R, the DVD-RW or the DVD-RAM which are capable of reproducing the record information normally is loaded in the information recording/reproducing apparatus at present to shift to the next reproducing processing.

On the other hand, under the determination of the step S69, if the second disk type information 9 is not "01b" (step S69; NO), in the present loaded optical disk, a type of the optical disk, which is indicated by the first disk type information 145, is different from the type of the optical disk, which is indicated by the second disk type information 9, so that this optical disk is highly possibly a DVD formed by illegally copying the record information therein. Then, this optical disk is immediately ejected from the information recording/reproducing apparatus (step S22) and the reproducing processing including the loading processing is terminated.

(B) A Modified Embodiment of the Reproducing Processing

At last, the reproducing processing according to the modified embodiment to be performed in succession to the above described loading processing will be explained with reference to FIG. 14.

Figure 14:
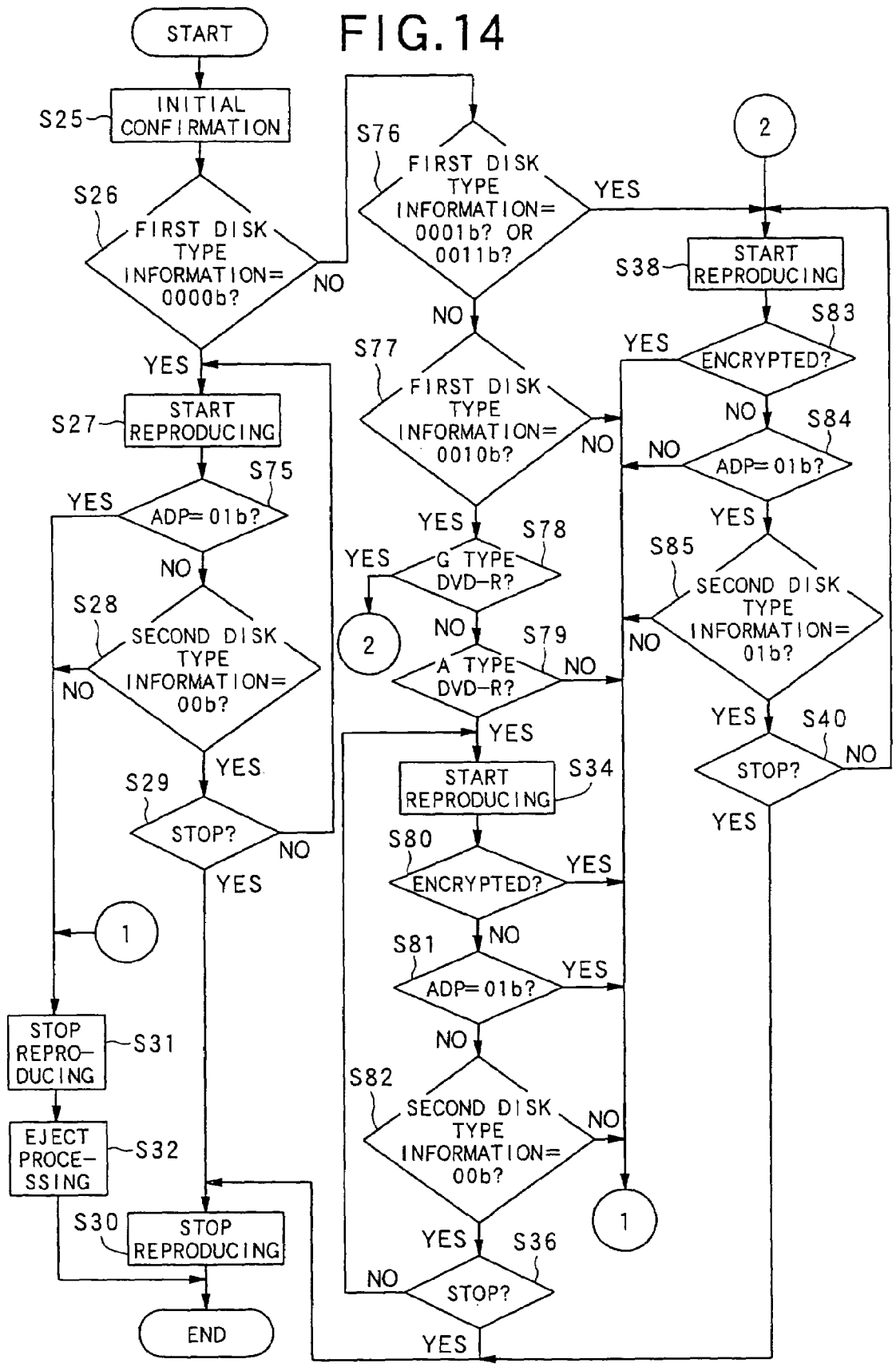
FIG. 14 is a flow chart for illustrating the information reproducing processing according to the modified embodiment.

Alternatively, FIG. 14 is a flow chart for illustrating the present reproducing processing. With respect to the same operation as the reproducing processing in the information recording/reproducing apparatus S according to the above described embodiment with reference to FIG. 10, the identical step numerals are given and the detailed explanations thereof are omitted.

As shown in FIG. 14, in the reproducing processing according to the modified embodiment, at first, the processing from the initial confirming processing (step S25) among the reproducing processing according to the embodiment, which was explained with reference to FIG. 10, to the reproduction starting processing (step S27) are performed.

Then, if the reproduction is started, the above described characteristic information CP is extracted from the sector information ST in the record information recorded in the DVD-ROM, which is confirmed in the step S26, and it is confirmed whether a content of the above described data type information ADP, which is included therein, is "01b" or not (step S75).

Further, if the content of the confirmed data type information ADP is "01b" (step S75; YES), as described above, the data type information ADP is not defined in the DVD-ROM and the A type DVD-R (refer to FIG. 11), so that it is originally impossible that a content of the first disk type information 145 confirmed in the step S26 is "0000b" and its data type information ADP is "01b". Therefore, in this case, assuming that there is a possibility that the optical disk provided with any illegal processing is loaded at present, the reproducing processing of this optical disk is immediately stopped (step S31) as well as this optical disk is ejected from the information recording/reproducing apparatus S (step S32) to terminate the reproducing processing including the loading processing.

On one hand, under the determination of the step S75, if the content of the confirmed data type information ADP is not "01b" (step S75; NO), assuming that the normal DVD-ROM is loaded at present in this case, then, it is determined whether the above described second disk type information 88 in the DSI data 51 is "00b" or not (step S28).

Therefore, if the second disk type information 88 is "00b" (step S28; YES), the reproducing processing is continued as assuming that the normal DVD-ROM is loaded in the information recording/reproducing apparatus, then, it is confirmed whether the operation to stop the reproducing processing is performed in the operating unit 133 or not (step S29).

Further, if the stop operation is not performed (step S29; NO), the processing is returned to the step S27 to continue the reproducing processing as well as a value of the second disk type information 88 in respective DSI data 51, which are sequentially obtained in accordance with the continuation of the reproduction, is confirmed. On one hand, if the stop operation is performed (step S29; YES) the reproducing processing is stopped as it is (step S30) and a series of the reproducing processing is terminated.

On the other hand, under the determination of the step S28, if the second disk type information 88 is not "00b" (step S28; NO), in the present loaded optical disk, the type of the optical disk, which is indicated by the first disk type information 145, is different from the type of the optical disk, which is indicated by the second disk type information 88, so that it is assumed that this DVD is highly possibly an optical disk formed by illegally copying the record information therein and the reproducing processing of this optical disk is immediately stopped (step S31) as well as this optical disk is ejected from the information recording/reproducing apparatus S (step S32) to terminate the reproducing processing.

On one hand, under the determination of the step S26, if the content of the detected first disk type information 145 is not "0000b" (step S26; NO), then, it is confirmed whether its value is "0011b" to indicate the DVD-RW or "0001b" to indicate the DVD-RAM or not (step S76).

Further, under the determination of the step S76, if a content of the first disk type information 145 is not "0001b" or "0011b" (step S76; NO), then, it is confirmed whether its value is "0010b" to indicate the DVD-R1R' or not (step S77).

Then, if a content of the first disk type information 145 is "0011b" (step S76; YES), then, it is confirmed whether the present loaded DVD-R 1R' is the G type DVD-R or not (step S78).

Alternatively, if a content of the first disk type information 145 is neither "0010b" (step S77; NO), it is perceived that the present loaded DVD is a DVD which is not belonged to any one of the normal types. Therefore, in this case, assuming that the present optical disk is an unauthentic optical disk, the reproducing processing of this optical disk is immediately stopped (step S31) as well as this optical disk is ejected from the information recording/reproducing apparatus S (step S32) to terminate the reproducing processing.

In the next place, under the determination of the step S78, if the present loaded DVD-R 1R' is not the G type DVD-R (step S78; NO), further, it is confirmed whether the present DVD-R 1R' is the A type DVD-R or not (step S79).

Then, if the present loaded DVD-R 1R' is neither the A type DVD-R (step S79; NO), it is perceived that the present loaded DVD is neither the G type DVD-R nor the A type DVD-R despite that the present loaded DVD is determined to be the DVD-R 1R' according to the first disk type information 145. Therefore, in this case, assuming that the present optical disk is highly possibly an optical disk formed by illegally copying the record information, the reproducing processing to this optical disk is immediately stopped (step S31) as well as this optical disk is ejected from the information recording reproducing apparatus S (step S32) to terminate the reproducing processing.

On one hand, under the determination of the step S79, if the present loaded DVD is the A type DVD-R (step S79; YES), then, the reproduction of the record information recorded in the present loaded DVD (detection from the A type DVD-R) is started (step S34), further, it is confirmed whether the record information recorded in the present A type DVD-R is provided with the encrypting processing or not (step S80). Further, if it is encrypted (step S80; YES), assuming that this record information is protected by the copyright and this record information should not be reproduced, the reproducing processing to this DVD-R 1R' is immediately stopped (step S31) as well as this DVD-R 1R' is ejected from the information recording/reproducing apparatus (step S32) to terminate the reproducing processing. On the other hand, if it is not encrypted (step S80; NO), then, the above described characteristic information CP is extracted from the sector information ST in the record information recorded in the present loaded A type DVD-R and it is confirmed whether a content of the above described data type information ADP included in the characteristic information CP is "01b" or not (step S81).

Then, if the content of the confirmed data type information ADP is "01b" (step S81; YES), as described above, since the data type information ADP is not defined by the DVD-ROM and the A type DVD-R (refer to FIG. 11), it is originally impossible that the content confirmed in the step S79 is the A type DVD-R as well as its data type information ADP is "01b". Therefore, in this case, assuming that the present loaded DVD-R is probably an optical disk provided with any illegal processing, the reproducing processing to this optical disk is immediately stopped (step S31) as well as this optical disk is ejected from the information recording/reproducing apparatus S (step S32) to terminate the reproducing processing.

On one hand, under the determination of the step S81, if the content of the confirmed data type information ADP is not "01b" (step S81; NO), assuming that the normal A type DVD-R is loaded at present in this case, then, it is determined whether the second disk type information 88 in the DSI data 51 is "00b" or not (step S82).

Therefore, if the second disk type information 88 is not "00b" (step S82; NO), it is assumed that the normal A type DVD-R is loaded in the information recording/reproducing apparatus at present to continue the reproducing processing. Then, it is confirmed whether the operation to stop the reproducing processing is performed in the operating unit 133 or not (step S36).

Further, if the stop operation is not performed is not performed (step S36; NO), the processing is returned to the step S34 to continue the reproducing processing as well as a value of the second disk type information 88 in respective DSI data 51, which are sequentially obtained in accordance with the continuation of the reproduction, is confirmed. On one hand, if the stop operation is performed (step S36; YES), the reproducing processing is stopped as it is (step S30) and a series of the reproducing processing is terminated.

On the other hand, under the determination of the step S82, if the second disk type information 88 is "00b" (step S82; YES), in the present loaded optical disk, the class of the optical disk, which is indicated by the first disk type information 145, is different from the type of the optical disk, which is indicated by the second disk type information 88, so that it is assumed that this optical disk is highly possibly an optical disk formed by illegally copying the record information therein and the reproducing processing of this optical disk is immediately stopped (step S31) as well as this optical disk is ejected from the information recording reproducing apparatus S (step S32) to terminate the reproducing processing.

In step S82 shown in FIG. 14, the same determination as that of step S7 in FIG. 9 is performed, even though the DVD, which is loaded in the information recording/reproducing apparatus of the modified embodiment and is the object of the determination, is the A type DVD-R. That is because this A type DVD-R is not sold to a consumer but used only for a test upon producing the DVD-ROM, so that it is supposed that it is enough that A type DVD-R functions only as the DVD-ROM in terms of the DVD for the test.

On one hand, under the determination of the above described step S76, if a content of the first disk type information 145 is any one of "0001b" or "0011b" (step S76; YES) or under the determination of the above described step S78, the present loaded DVD-R 1R' is the G type DVD-R (step S78; YES), then, the reproduction of the recording information recorded in the present loaded DVD (detection from the DVD) is started (step S34), further, it is confirmed whether the record information recorded in respective DVD are provided with the encrypting processing or not (step S83). Further, if it is encrypted (step S83; YES), assuming that this record information is protected by the copyright and this record information should not be reproduced, the reproducing processing to this DVD is immediately stopped (step S31) as well as this DVD is ejected from the information recording/reproducing apparatus (step S32) to terminate the reproducing processing. On the other hand, if it is not encrypted (step S83; NO), then, the above described characteristic information CP is extracted from the sector information ST in the record information recorded in the present loaded DVD and it is confirmed whether a content of the above described data type information ADP included in the characteristic information CP is "01b" or not (step S84).

Then, if the content of the confirmed data type information ADP is not "01b" (step S84; NO), as described above, since the data type information ADP is defined only in the DVD-RW, the DVD-RAM or the G type DVD-R (refer to FIG. 11), the content which is confirmed in the step S76 or the step S78 is not identical with the content which is confirmed in the step S84. Therefore, in this case, assuming that the present loaded optical disk is probably an optical disk provided with any illegal processing, the reproducing processing to this DVD is immediately stopped (step S31) as well as this DVD is immediately ejected from the information recording/reproducing apparatus (step S32) to terminate the reproducing processing including the loading processing.

On one hand, if the content of the confirmed data type information ADP is "01b" (step S84; YES), it is perceived that the content, which is confirmed in the step S76 or the step S78, is appropriate as the normal DVD-RW, DVD-RAM or DVD-R, so that, in the next place, it is determined whether the above described second disk type information 88 is "01b" or not (step S85).

Therefore, if the second disk type information 88 is "01b" (step S85; YES), it is assumed that any one of the G type DVD-R, the DVD-RW or the DVD-RAM which are capable of reproducing the record information normally is loaded in the information recording/reproducing apparatus at present to continue the reproducing processing. Then, it is confirmed whether the operation to stop the reproducing processing is performed in the operating unit 133 or not (step S40).

Further, if the stop operation is not performed is not performed (step S40; NO), the processing is returned to the step S38 to continue the reproducing processing as well as a value of the second disk type information 88 in respective DSI data 51, which are sequentially obtained in accordance with the continuation of the reproduction, is confirmed. On one hand, if the stop operation is performed (step S40; YES), the reproducing processing is stopped as it is (step S30) and a series of the reproducing processing is terminated.

On the other hand, under the determination of the step S85, if the second disk type information 88 is not "01b" (step S85; NO), in the present loaded optical disk, the type of the optical disk, which is indicated by the first disk type information 145, is different from the type of the optical disk, which is indicated by the second disk type information 88, so that it is assumed that this DVD is highly possibly a DVD formed by illegally copying the record information therein and the reproducing processing of this DVD is immediately stopped (step S31) as well as this optical disk is ejected from the information recording reproducing apparatus (step S32) to terminate the reproducing processing.

As described above, even in the case of performing the operation of the information recording/reproducing apparatus according to the modified embodiment, it is possible to obtain the same effect as that of the information recording/reproducing apparatus S according to the above described embodiment.

Alternatively, the above described embodiment and the modified embodiment are explained on the assumption that the first disk type information 145 and the second disk type information 9 and 88 have the same content each other. However, in addition to this, it is possible to constitute the embodiment and the modified embodiment in such a manner that the first disk type information 145 and the second disk type information 9 and 88 are set so as to have a predetermined corresponding relation, which is capable of being recognized only by the normal information recording/reproducing apparatus to record the recording information.

Alternatively, the above described embodiment and the modified embodiment are explained on the assumption that the second disk type information 9 is recorded in the VMGI 4 and the second disk type information 88 is recorded in the DSI data 51, respectively. However, in order to further make the interpolation difficult, for example, it is possible to constitute the embodiment and the modified embodiment in such a manner that the present second disk type information are recorded in a portion of the copy protection information, which is set in advance.

Further, although the interpolation becomes rather easy, it is also possible to constitute the embodiment and the modified embodiment in such a manner that any one of the second disk type information 9 and 88 is recorded and the class of the optical disk which is indicated by the present one of the second disk type information 9 and 88 is compared to the type of the optical disk which is indicated by the first type information 145 so as to control the reproducing processing.

Furthermore, according to the above described embodiment, if the type of the optical disk which is indicated by the first disk type information 145 is different from the type of the optical disk which is indicated by the second disk type information 9 in the VMGI 4 upon the loading processing, this optical disk is ejected to the outside. However, the embodiment may be constituted so as to perform this determination upon the reproducing processing.

Alternatively, it is matter of course that a display panel of the information recording/reproducing apparatus and an externally connected display or the like may display the warning in spite of ejecting the optical disk in which the recording information is illegally copied to the outside.

Furthermore, the invention may be applied to the illegal copy protection processing for the CD capable of recording the information or the like in addition to the above described DVD capable of recording the information.

Furthermore, recording a program corresponding to a flow chart shown in FIGS. 8 to 10 and FIGS. 12 to 14 in a flexible disk or a hard disk or the like as an information recording medium and reading out it by using a personal computer or the like to be executed, it is also possible to operate the personal computer or the like as the above described system controller 125.

Accordingly, by effectively prohibiting the reproduction of the recording information, which is provided with the above illegal recording processing by the information processing apparatus or the like, the recording medium in which the private recording information is recorded and the recording medium in which the recording information is illegally copied are differentiated and the reproduction of the recording information, which is recorded in the recording medium in which the recording information is illegally copied, is prevented, so that it is possible to effectively protect a copy right.

The entire disclosures of Japanese Patent Application No. 2000-308490 filed on Oct. 06, 2000 and Japanese Patent Application No. 2001-290123 filed on Sep. 21, 2001 including the specification, claims, diagrams and summary is incorporated herein by reference in its entirety.

The invention claimed is:

1. An information recording apparatus for recording record information in a recording medium in which a first type information indicating a type of the recording medium is recorded in advance, the apparatus comprising:

a type information recording device for recording a second type information, whose correspondence to the first type information is set in advance, in the recording medium in which the first type information is recorded; and a recording device for recording the record information in the recording medium, wherein said record information comprises a plurality of record information units, and said type information recording device records said second type information in both a whole management information for managing the whole of the record information and each of the respective record information units.

2. The information recording apparatus according to claim 1, wherein said type information recording device records said second type information, which indicates the same content as that the first type information indicates, in the recording medium.

3. The information recording apparatus according to claim 1, wherein said type information recording device records said second type information, which indicates a recordable recording medium, in the recording medium.

4. The information recording apparatus according to claim 1, wherein said first type information is recorded in lead-in area of the recording medium, and the second type information is recorded in data area which the record information is recorded.

5. The information recording apparatus according to claim 1, wherein said first type information indicates that the recording medium is any one of DVD-ROM, DVD-R, DVD-RAM and DVD-RW.

6. The information recording apparatus according to claim 5, wherein said DVD-R includes General type DVD-R and Authoring type DVD-R, and said type information recording device records said second type information, which indicates a recordable recording medium, in the recording medium, when the recording medium is any one of the General type DVD-R, the DVD-RAM and the DVD-RW.

7. The information recording apparatus according to claim 5, wherein said DVD-R includes General type DVD-R and Authoring type DVD-R, and said type information recording device records said second type information, which indicates a read only recording medium, in the recording medium, when the recording medium is the Authoring type DVD-R.

8. An information reproducing apparatus for reproducing record information from a recording medium in which the record information, a first type information and second type information are recorded, said first type information indicating a type of the recording medium, said second type information corresponding to the first type information, said apparatus comprising:

a first detecting device for detecting said first type information from the recording medium;

a second detecting device for detecting said second type information from the recording medium; and a reproducing device for reproducing the record information only when the detected second type information has the correspondence to the detected first type information, which is set in advance, wherein said record information comprises a plurality of record information units, and said second type information is recorded in both a whole management information for managing the whole of the record information and each of the respective record information units.

9. The information reproducing apparatus according to claim 8, wherein said reproducing device ejects the recording medium loaded in the information reproducing apparatus from the information reproducing apparatus if the detected second type information has the correspondence to the detected first type information, which is different from the correspondence set in advance.

10. The information reproducing apparatus according to claim 8, wherein said correspondence set in advance is that said second type information indicates the same content as that the first type information indicates.

11. The information reproducing apparatus according to claim 8, wherein said correspondence set in advance is that said second type information indicates whether the recording medium is a recordable recording medium or not.

12. The information reproducing apparatus according to claim 8, wherein said first type information is recorded in lead-in area of the recording medium, and the second type information is recorded in data area which the record information is recorded.

13. The information reproducing apparatus according to claim 8, wherein said first type information indicates that the recording medium is any one of DVD-ROM, DVD-R, DVD-RAM and DVD-RW.

14. The information reproducing apparatus according to claim 13, wherein said DVD-R includes General type DVD-R and Authoring type DVD-R, and said reproducing device reproduces the record information, when the first type information indicates DVD-ROM or the Authoring type DVD-R and the value of the second type information indicates a read only recording medium.

15. The information reproducing apparatus according to claim 13, wherein said DVD-R includes General type DVD-R and Authoring type DVD-R, and said reproducing device reproduces the record information, when the first type information indicates that the recording medium is any one of the General type DVD-R, DVD-RAM and DVD-RW and the value of the second type information indicates a recordable recording medium.

16. A recording medium, for use in an information recording and/or reproducing apparatus, said medium comprising:

a first type information recording area in which a first type information indicating a type of the recording medium is recorded in advance;

a second type information recording area in which a second type information, whose correspondence to the first type information is set in advance, can be recorded; and a record information recording area in which record information to be recorded in the recording medium can be recorded, wherein the record information comprises a plurality of record information units, and said second type information recording area is formed in both a whole management information for managing the whole of the record information and each of the respective record information units.

17. The recording medium according to claim 16, wherein said correspondence set in advance is that said second type information indicates the same content as that the first type information indicates.

18. The recording medium according to claim 16, wherein said correspondence set in advance is that said second type information indicates whether the recording medium is a recordable recording medium or not.

19. The recording medium according to claim 16, wherein said first type information recording area of the recording medium, and the second type information is formed in the record information recording area.

20. The recording medium according to claim 16, wherein a value of the first disk type information indicated that the recording medium is any one of DVD-ROM, DVD-R, DVD-RAM and DVD-RW.

21. The recording medium according to claim 20, wherein said DVD-R includes General type DVD-R and Authoring type DVD-R, and
said second type information which indicates a read only recording medium is recorded in the second type information recording area, when the first type information indicates DVD-ROM or the Authoring type DVD-R.

22. The recording medium according to claim 20, wherein said DVD-R includes General type DVD-R and Authoring type DVD-R, and
said second type information which indicates a recordable recording medium is recorded in the second type information recording area, when the first type information indicates that the recording medium is any one of the General type DVD-R, DVD-RAM and DVD-RW.

23. An information recording method of recording record information in a recording medium in which a first type information indicating a type of the recording medium is recorded in advance, the method comprising:
a type information recording process for recording a second type information, whose correspondence to the first type information is set in advance, in the recording medium in which the first type information is recorded; and
a recording process for recording the record information in the recording medium,
wherein said record information comprises a plurality of record information units, and said type information recording process records said second type information in both a whole management information for managing the whole of the record information and each of the respective record information units.

24. The information recording method according to claim 23, wherein said type information recording process records said second type information, which indicates the same content as that the first type information indicates, in the recording medium.

25. The information recording method according to claim 23, wherein said type information recording process records said second type information, which indicates a recordable recording medium, in the recording medium.

26. The information recording method according to claim 23, wherein said first type information is recorded in lead-in area of the recording medium, and the second type information is recorded in data area which the record information is recorded.

27. The information recording method according to claim 23, wherein said first type information indicates that the recording medium is any one of DVD-ROM, DVD-R, DVD-RAM and DVD-RW.

28. The information recording method according to claim 27, wherein said DVD-R includes General type DVD-R and Authoring type DVD-R, and
said type information recording process records said second type information, which indicates a recordable recording medium, in the recording medium, when the recording medium is any one of the General type DVD-R, the DVD-RAM and the DVD-RW.

29. The information recording method according to claim 27, wherein said DVD-R includes General type DVD-R and Authoring type DVD-R, and
said type information recording process records said second type information, which indicates a read only recording medium, in the recording medium, when the recording medium is the Authoring type DVD-R.

30. An information reproducing method of reproducing record information from a recording medium in which the record information, a first type information and second type information are recorded, said first type information indicating a type of the recording medium, said second type information corresponding to the first type information, said method comprising:
a first detecting process for detecting said first type information from the recording medium;
a second detecting process for detecting said second type information from the recording medium; and
a reproducing process for reproducing the record information only when the detected second type information has the correspondence to the detected first type information, which is set in advance,
wherein said record information comprises a plurality of record information units, and said second type information is recorded in both a whole management information for managing the whole of the record information and each of the respective record information units.

31. The information reproducing method according to claim 30, wherein said reproducing process ejects the recording medium loaded in the information reproducing apparatus from the information reproducing apparatus if the detected second type information has the correspondence to the detected first type information, which is different from the correspondence set in advance.

32. An information recording medium in which a recording control program is recorded readably by a recording computer in an information recording apparatus for recording record information in a recording medium in which a first type information indicating a type of the recording medium is recorded in advance, the recording control program causing the recording computer to function as:
a type information recording device for recording a second type information, whose correspondence to the first type information is set in advance, in the recording medium in which the first type information is recorded; and
a recording device for recording the record information in the recording medium,
wherein the record information comprises a plurality of record information units, and said type information recording device records said second type information in both a whole management information for managing the whole of the record information and each of the respective record information units.

33. The information recording medium according to claim 32, wherein said first type information is recorded in lead-in area of the recording medium, and the second type information is recorded in data area which the record information is recorded.

34. The information recording medium according to claim 32, wherein said first type information indicates that the recording medium is any one of DVD-ROM, DVD-R, DVD-RAM and DVD-RW.

35. The information recording medium according to claim 34, wherein said DVD-R includes General type DVD-R and Authoring type DVD-R, and said type information recording device records said second type information, which indicates a recordable recording medium, in the recording medium, when the recording medium is any one of the General type DVD-R, the DVD-RAM and the DVD-RW.

36. The information recording medium according to claim 34, wherein said DVD-R includes General type DVD-R and Authoring type DVD-R, and said type information recording device records said second type information, which indicates a read only recording medium, in the recording medium, when the recording medium is the Authoring type DVD-R.

37. An information recording medium in which a reproducing control program is recorded readably by a reproducing computer in an information reproducing apparatus for reproducing record information from a recording medium in which the record information, a first type information and second type information are recorded, said first type information indicating a type of the recording medium, said second type information corresponding to the first type information, said reproducing control program causing said reproducing computer to function as:

- a first detecting device for detecting said first type information from the recording medium;
- a second detecting device for detecting said second type information from the recording medium; and
- a reproducing device for reproducing the record information only when the detected second type information has the correspondence to the detected first type information, which is set in advance, wherein said record information comprises a plurality of record information units, and said second type information is recorded in both a whole management information for managing the whole of the record information and each of the respective record information units.

38. The information recording medium according to claim 37, wherein said reproducing device ejects the recording medium loaded in the information reproducing apparatus from the information reproducing apparatus if the detected second type information has the correspondence to the detected first type information, which is different from the correspondence set in advance.

* * * * *